United States Patent
Ausserlechner

(10) Patent No.: US 8,085,036 B2
(45) Date of Patent: Dec. 27, 2011

(54) SENSOR INCLUDING TWO CODE RINGS AND A MAGNETIC FIELD SENSOR BETWEEN THE CODE RINGS

(75) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 354 days.

(21) Appl. No.: 12/353,641

(22) Filed: Jan. 14, 2009

(65) Prior Publication Data

US 2010/0176799 A1    Jul. 15, 2010

(51) Int. Cl.
*G01B 7/30* (2006.01)
(52) U.S. Cl. .................................. 324/207.25
(58) Field of Classification Search ............... 324/207.25
See application file for complete search history.

(56) References Cited

U.S. PATENT DOCUMENTS

| | | | |
|---|---|---|---|
| 4,746,859 A | 5/1988 | Malik | |
| 5,195,382 A | 3/1993 | Peilloud | |
| 5,371,635 A * | 12/1994 | Sakaguchi et al. | ......... 360/73.03 |
| 7,210,360 B2 | 5/2007 | Schroeder et al. | |
| 7,339,370 B2 * | 3/2008 | Reimer et al. | ........... 324/207.25 |

FOREIGN PATENT DOCUMENTS

| | | |
|---|---|---|
| DE | 100036281 | 2/2002 |
| DE | 102007057050 | 7/2008 |
| JP | 09189624 | 7/1997 |

OTHER PUBLICATIONS

"Development of a Contactless Hall Effect Torque Sensor for Electric Power Steering", Didier Angleviel, SAE International, 2005 (8 pgs.).

* cited by examiner

*Primary Examiner* — Reena Aurora
(74) *Attorney, Agent, or Firm* — Dicke, Billig & Czaja, PLLC

(57) ABSTRACT

An apparatus includes a shaft and a first code ring including a first number of pole pairs. The first code ring is attached to the shaft. The apparatus includes a second code ring including a second number of pole pairs different from the first number. The second code ring is attached to the shaft and spaced apart from the first code ring. The apparatus includes a first magnetic field sensor between the first code ring and the second code ring for sensing a first superposition of magnetic fields provided by the first code ring and the second code ring.

25 Claims, 13 Drawing Sheets

SENSOR INCLUDING TWO CODE RINGS AND A MAGNETIC FIELD SENSOR BETWEEN THE CODE RINGS

BACKGROUND

One type of sensing system uses a permanent magnetic pole wheel. The magnetic pole wheel is typically used to detect the angular position and/or speed of a shaft to which the magnetic pole wheel is attached. A magnetic pole wheel includes a plurality of magnetic domains with alternating polarity (i.e., pole pairs) along the circumference of the magnetic pole wheel. These domains are magnetized in the axial, radial, and/or tangential direction of the magnetic pole wheel. The domains produce a magnetic field (B) as follows:

$$B(\psi, r, z) = b(r, z) * \sin(N * \psi + \psi 0) \quad \text{Equation I}$$

where:
$\psi$ is the azimuthal angle ranging from 0° to 360;
$\psi 0$ is the phase shift;
r is the radial coordinate with r=0 on the axis of rotation;
z is the axial coordinate with z=0 in the mid-plane of the magnetic pole wheel;
N is the number of pole pairs along the circumference of the magnetic pole wheel; and
b(r,z) is a function describing the attenuation of the magnetic field versus distance of the magnetic pole wheel.

Each pole pair includes one south pole and one north pole, which are the source and the sink of the magnetization. Two adjacent north poles are a distance ($\lambda$) apart, which is the magnetic pitch, with $\lambda$ defined as:

$$\lambda = \frac{\text{perimeter}}{N} \quad \text{Equation II}$$

where:
perimeter is the perimeter of the magnetic pole wheel.

All three components of the magnetic field (i.e., the radial, the axial, and the azimuthal component) follow Equation I above, except for the value of $\psi 0$, which denotes the phase shift.

If the movement of a shaft is small, (e.g., if detection of the twisting of a shaft due to a moment load or any kind of deformation of a rigid body is desired), typical sensing systems are not sensitive enough to achieve a good accuracy and resolution. When a magnetic pole wheel rotates, the magnetic field pattern rotates synchronously. The magnetic field is detected by a magnetic field sensor. Typically, the magnetic field sensor generates a pulse if the magnetic field passes through zero, thereby digitizing the angular position of the magnetic pole wheel.

If a magnetic pole wheel has 10 pole pairs, the period of the magnetic field is 360°/10=36°. It is common for magnetic pole wheels to include 60 pole pairs for obtaining one pulse for every 6° of rotation. To increase the angular resolution of a magnetic pole wheel, more magnetic domains or pole pairs along the circumference of the magnetic pole wheel are used. The resolution of a magnetic pole wheel is limited, however, since it is impossible to magnetize domains that are too small.

In addition, the magnitude of the magnetic field decreases proportionally to $\exp(-2*\pi*z/\lambda)$ and $\exp(-2*\pi*r/\lambda)$. Therefore, at a constant air gap (i.e., the distance of the magnetic field sensor to the magnetic pole wheel), the magnetic field decreases substantially for small $\lambda$ (i.e., for large N). Since there is typically some clearance between the magnetic pole wheel and the magnetic field sensor, the signal provided by the magnetic field sensor may decrease substantially over the lifetime of the sensing system due to growing slackness of bearings and/or deformation caused by loads.

Further, with typical magnetic pole wheels, the position of the magnetic pole wheel can be sensed only incrementally. That is, each time the magnetic pole wheel is turned by several degrees, the magnetic pole wheel provides a pulse. Therefore, the sensing system cannot detect the absolute position of the magnetic pole wheel; rather the sensing system merely detects changes in the position of the magnetic pole wheel. To determine the absolute position of the magnetic pole wheel, the pulses are summed. This summing of the pulses, however, is problematic if the magnetic pole wheel changes position while the magnetic field sensor is powered down. In this case, the sensing system looses track of the absolute position of the magnetic pole wheel.

Rotational position may also be detected by angle sensors that detect the direction of a homogeneous magnetic field acting on a magnetic field sensor including a sensor die. Typical sensing systems use a small permanent magnet that is attached to the end of a shaft and that is magnetized perpendicularly to the axis of rotation. The magnetic field of the permanent magnet is parallel to the sensor die if the sensor die is placed ahead of the permanent magnet and perpendicularly to the rotation axis. These sensing systems are fairly accurate (e.g., 1° accuracy), however, they are too slow to provide a real time signal with a delay on the order of microseconds as is needed for many applications. Also, the end of the shaft may not be available for attaching the permanent magnet. Another problem with these sensing systems is that they are susceptible to magnetic interference since the measurement is not differential. Any background magnetic field changes the direction of the working magnetic field from the permanent magnet and results in an angle error.

For these and other reasons, there is a need for the present invention.

SUMMARY

One embodiment provides an apparatus. The apparatus includes a shaft and a first code ring including a first number of pole pairs. The first code ring is attached to the shaft. The apparatus includes a second code ring including a second number of pole pairs different from the first number. The second code ring is attached to the shaft and spaced apart from the first code ring. The apparatus includes a first magnetic field sensor between the first code ring and the second code ring for sensing a first superposition of magnetic fields provided by the first code ring and the second code ring.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
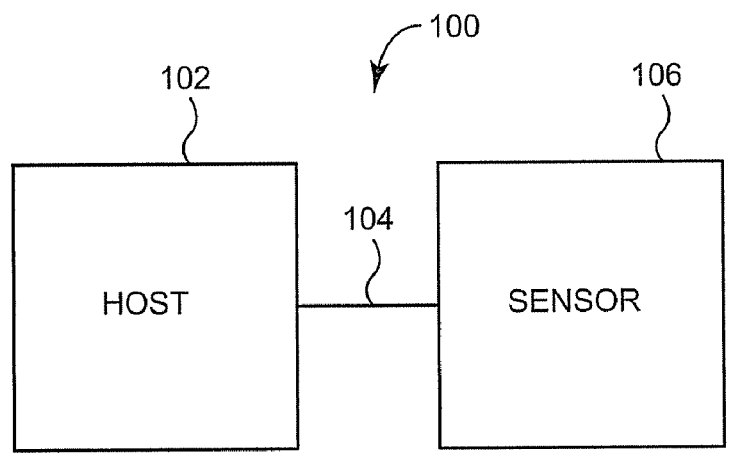
FIG. 1 is a diagram illustrating one embodiment of a system.

FIG. 1 is a diagram illustrating one embodiment of a system 100. System 100 includes a host 102 and a sensor 106. Host 102 is communicatively coupled to sensor 106 through communication link 104. Host 102 includes a microprocessor, computer, controller, or any other suitable device for receiving data from sensor 106. Sensor 106 communicates data to host 102 though communication link 104. In one embodiment, communication link 104 is a wireless communication link.

In one embodiment, sensor 106 is a position sensor for detecting the twisting of a shaft due to a moment load or other deformation of a rigid body. In this embodiment, sensor 106 includes two magnetic code wheels including slightly different sized poles. One of the code wheels is moved with respect to the other code wheel by a small displacement (e.g., by a deformation of a shaft). A magnetic field sensor is placed between the two code wheels to measure the interference pattern of the magnetic fields produced by both of the code wheels. From the interference pattern of the magnetic fields produced by both of the code wheels, the deformation of the shaft is determined.

In another embodiment, sensor 106 is an angle sensor. In this embodiment, sensor 106 includes two target rings attached to a rotor. A magnetic field sensor is positioned between the two target rings and is attached to a stator. In another embodiment, the two target rings are attached to the stator and the magnetic field sensor is attached to the rotor. The two target rings are either permanent magnetic pole rings or soft magnetic toothed rings. The target rings have different numbers of poles or teeth. In one embodiment, the magnetic field sensor detects the interference pattern of the magnetic fields of both target rings. In another embodiment, the magnetic field sensor detects each magnetic field separately and combines the information in a signal processing unit. From the interference pattern of the magnetic fields of both target rings, the rotation angle in the range of 0° to 360° is determined in real time.

Figure 2:
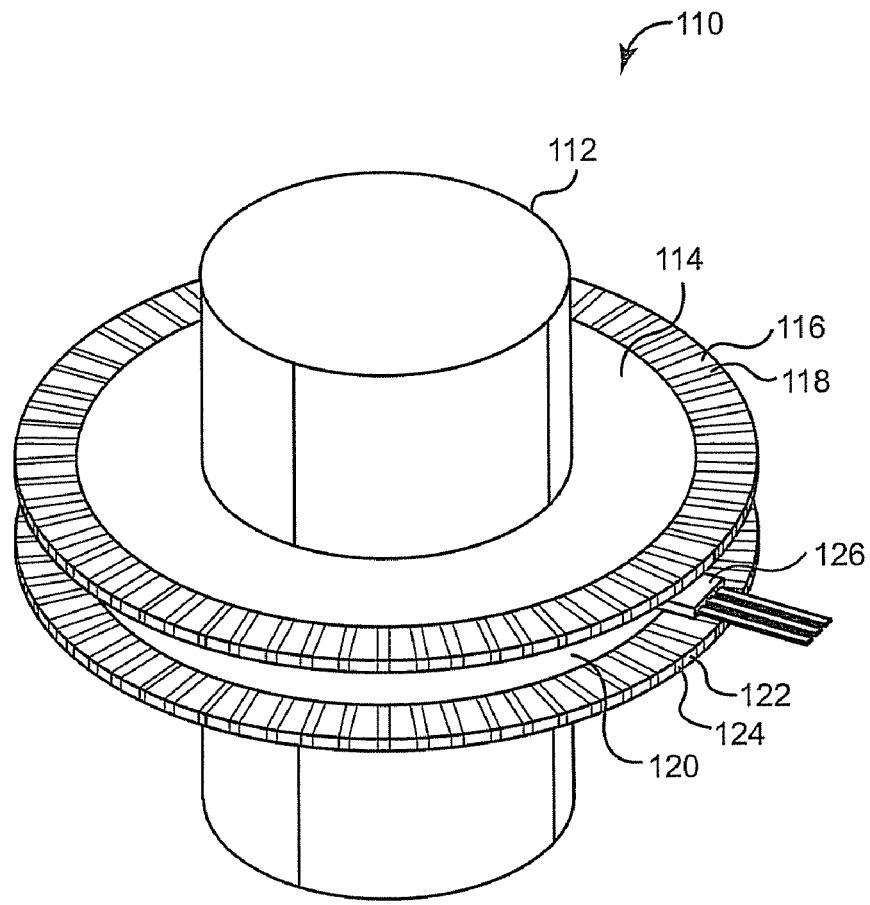
FIG. 2 is a diagram illustrating one embodiment of a position sensor.

FIG. 2 is a diagram illustrating one embodiment of a position sensor 110. In one embodiment, position sensor 110 provides sensor 106 previously described and illustrated with reference to FIG. 1. Position sensor 110 includes a shaft 112, a first magnetic code wheel 114, a second magnetic code wheel 120, and a magnetic field sensor 126. First magnetic code wheel 114 includes a plurality of north poles 116 and south poles 118 to provide a first plurality of pole pairs. Second magnetic code wheel 120 includes a plurality of north poles 122 and south poles 124 to provide a second plurality of pole pairs. First code wheel 114 includes a different number of pole pairs than second code wheel 120.

One of first code wheel 114 and second code wheel 120 is attached to a fixed reference frame of shaft 112 and the other one of first code wheel 114 and second code wheel 120 is attached to a part of shaft 112 that moves due to deformation. In one embodiment, first code wheel 114 is spaced apart from second code wheel 120 by a few millimeters. Magnetic field sensor 126 is placed in between first code wheel 114 and second code wheel 120. In one embodiment, magnetic field sensor 126 is attached to the fixed reference frame of shaft 112.

The magnetic field provided by each of first code wheel 114 and second code wheel 120 is a sine wave pattern versus azimuthal coordinate ψ. The superposition of the magnetic fields provided by both first code wheel 114 and second code wheel 120 provides typical effects of interference of phase coherent wave phenomena. If one of code wheels 114 and 120 moves by one pitch (i.e., one pole pair) with respect to the other one of code wheels 114 and 120, the interference pattern moves by 360°. Thus, position sensor 110 has a gear ratio of 1:N, if one of code wheels 114 and 120 includes N pole pairs and the other one of code wheels 114 and 120 includes (N−1) pole pairs.

This principle is used to measure very small displacements, such as the torsion of shaft 112, since the small torsion is amplified. This principle is also used to measure suitable linear structures by replacing code wheels 114 and 120 with linear strips of periodically arranged permanent magnets, which will be described below. Therefore, the principle can be used to measure all suitable kinds of deformation.

Magnetic field sensor 126 includes a sensor die including one or more sensor elements for sensing magnetic fields. Magnetic field sensor 126 is positioned between first code wheel 114 and second code wheel 120 such that the center of magnetic field sensor 126 coincides with the minimum of the interference pattern. If one of code wheels 114 and 120 moves to the left or right by 0.1°, the minimum of the interference pattern also moves to the left or right by 6° (for N=60). If the diameter of code wheels 114 and 120 is 30 mm, then a 6° shift corresponds to a displacement of 1.5 mm on the sensor die of magnetic field sensor 126. Magnetic field sensor 126 compares the outputs of all of the sensor elements to detect the location of the minimum of the interference pattern or the minimum of the envelope of the interference pattern. Thus, very small movements of code wheels 114 and 120 with respect to each other can be determined.

In one embodiment, shaft 112 includes a thinner portion (not shown) between first code wheel 114 and second code wheel 120 such that a moment on shaft 112 twists one code wheel with respect to the other code wheel by a few tenths of a degree. The position tolerances of sensor 110 are not a big concern since the entire assembly is rigid and includes no bearings and therefore no slackness. Both first code wheel 114 and second code wheel 120 are attached to the same shaft 112, which deforms under a load. The torsional deformation is measured by magnetic field sensor 126. All other deformations should be minimized, yet they are not critical for the sensing system.

Figure 3:
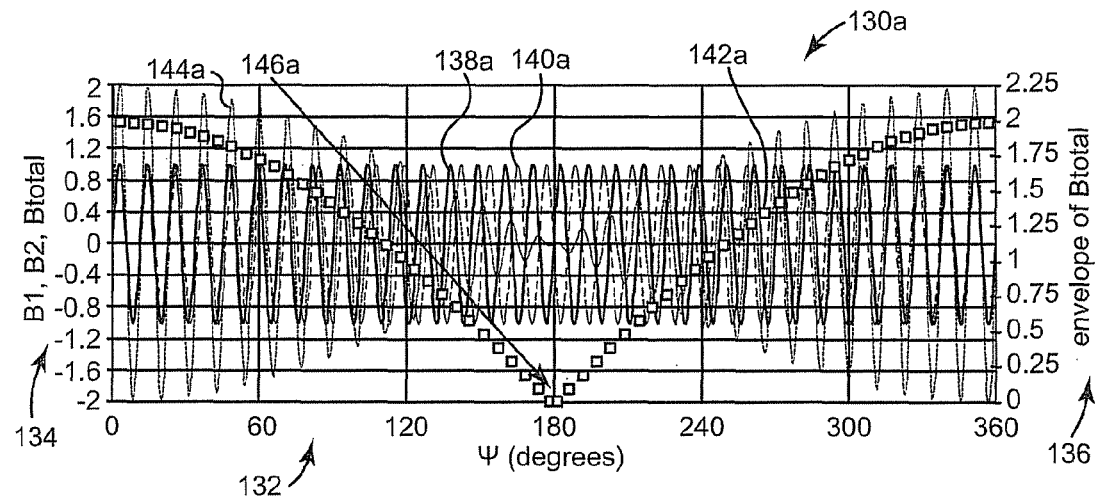
FIG. 3 is a chart illustrating one embodiment of magnetic fields and an envelope of a total magnetic field detected by a position sensor.
Figure 4:
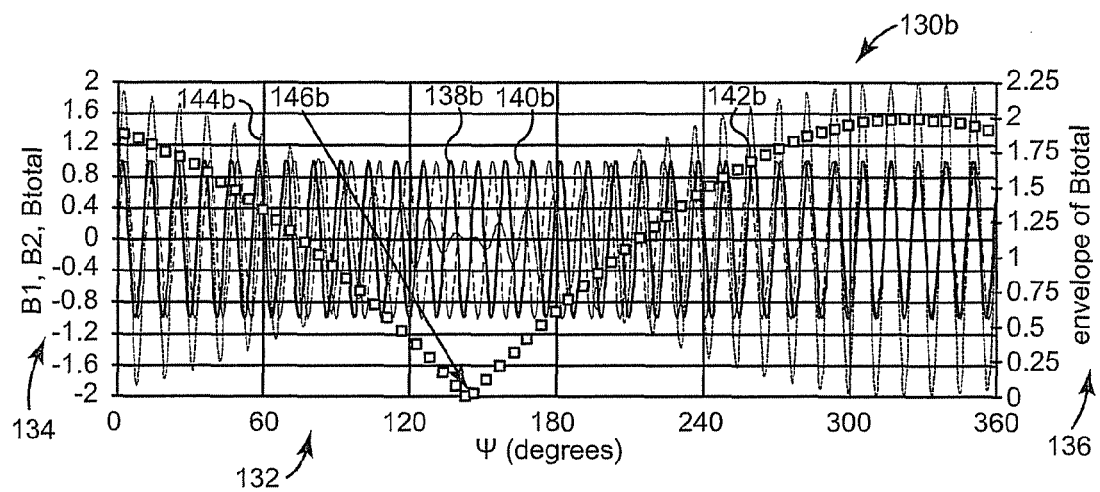
FIG. 4 is a chart illustrating another embodiment of magnetic fields and an envelope of a total magnetic field detected by a position sensor.
Figure 5:
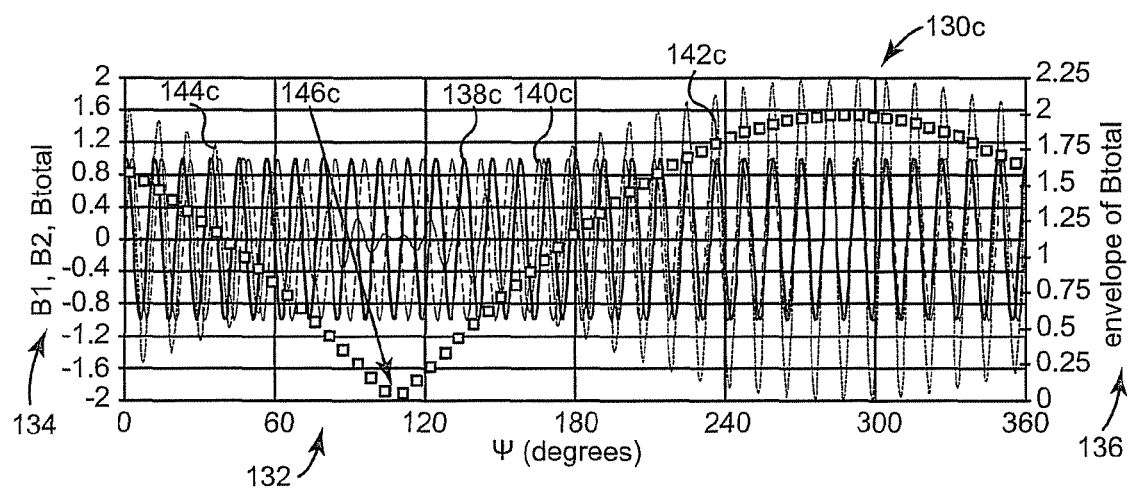
FIG. 5 is a chart illustrating another embodiment of magnetic fields and an envelope of a total magnetic field detected by a position sensor.

The followings FIGS. 3-5 are charts illustrating that the minimum of the envelope of the interference pattern shifts by 0°, 36°, and 72° if one of code wheels 114 and 120 is shifted by a value ($\alpha$) of 0°, 1.125°, and 2.25° with respect to the other code wheel 114 and 120, respectively.

FIG. 3 is a chart 130a illustrating one embodiment of magnetic fields and an envelope of a total magnetic field detected by a position sensor, such as position sensor 110 previously described and illustrated with reference to FIG. 2. In this embodiment, $\alpha$ equals 0°. Chart 130a indicates $\psi$ in degrees on x-axis 132. Chart 130a indicates the amplitude of the magnetic field ($B_1$) from a first code wheel, the amplitude of the magnetic field ($B_2$) from a second code wheel, and the amplitude of the total magnetic field ($B_{total}$) on y-axis 134. Chart 130a indicates the amplitude of the envelope of the total magnetic field on y-axis 136.

The magnetic field of the first code wheel is indicated at 138a for a code wheel where N equals 32 pole pairs and the amplitude equals one. The magnetic field of the second code wheel is indicated at 140a for a code wheel where N equals 31 pole pairs and the amplitude equals one. The total magnetic field detected by the magnetic field sensor positioned between the first code wheel and the second code wheel is indicated at 144a. The envelope of the total magnetic field is indicated at 142a. As indicated by chart 130a, for a code wheel shift of $\alpha$ equal to 0°, the minimum of the envelope of the total magnetic field is at $\psi$ equal to 180° as indicated at 146a.

FIG. 4 is a chart 130b illustrating another embodiment of magnetic fields and an envelope of a total magnetic field detected by a position sensor, such as position sensor 110 previously described and illustrated with reference to FIG. 2. In this embodiment, $\alpha$ equals 1.125°. Chart 130b indicates $\psi$ in degrees on x-axis 132. Chart 130b indicates the amplitude of magnetic field ($B_1$) from the first code wheel, the amplitude of the magnetic field ($B_2$) from the second code wheel, and the amplitude of the total magnetic field ($B_{total}$) on y-axis 134. Chart 130b indicates the amplitude of the envelope of the total magnetic field on y-axis 136.

The magnetic field of the first code wheel is indicated at 138b for a code wheel where N equals 32 pole pairs and the amplitude equals one. The magnetic field of the second code wheel is indicated at 140b for a code wheel where N equals 31 pole pairs and the amplitude equals one. The total magnetic field detected by the magnetic field sensor positioned between the first code wheel and the second code wheel is indicated at 144b. The envelope of the total magnetic field is indicated at 142b. As indicated by chart 130b, for a code wheel shift of $\alpha$ equal to 1.125°, the minimum of the envelope of the total magnetic field is at $\psi$ equal to 144° as indicated at 146b.

FIG. 5 is a chart 130c illustrating another embodiment of magnetic fields and an envelope of a total magnetic field detected by a position sensor, such as position sensor 110 previously described and illustrated with reference to FIG. 2. In this embodiment, $\alpha$ equals 2.25°. Chart 130c indicates $\psi$ in degrees on x-axis 132. Chart 130c indicates the amplitude of magnetic field ($B_1$) from the first code wheel, the amplitude of the magnetic field ($B_2$) from the second code wheel, and the amplitude of the total magnetic field ($B_{total}$) on y-axis 134. Chart 130c indicates the amplitude of the envelope of the total magnetic field on y-axis 136.

The magnetic field of the first code wheel is indicated at 138c for a code wheel where N equals 32 pole pairs and the amplitude equals one. The magnetic field of the second code wheel is indicated at 140c for a code wheel where N equals 31 pole pairs and the amplitude equals one. The total magnetic field detected by the magnetic field sensor positioned between the first code wheel and the second code wheel is indicated at 144c. The envelope of the total magnetic field is indicated at 142c. As indicated by chart 130c, for a code wheel shift of $\alpha$ equal to 2.25°, the minimum of the envelope of the total magnetic field is at $\psi$ equal to 108° as indicated at 146c.

As indicated in FIGS. 3-5, the minimum of the interference pattern is zero only in the symmetry plane between both code wheels where the field amplitudes of both code wheels are equal. If the magnetization of the code wheels are not equally strong or if the thickness of the code wheels is not identical or if the magnetic field sensor is not mounted at the exact center location between the code wheels (due to tolerances of the magnetic field integrated circuit package or the module in which the integrated circuit package is glued or potted into) the minimum does not exactly vanish or go to zero. This is not a problem, however, since even if the magnetic fields of both code wheels differ by 20%, the minimum is still as low as 0.2/2.2 or 9% as indicated in the following FIG. 6.

Figure 6:
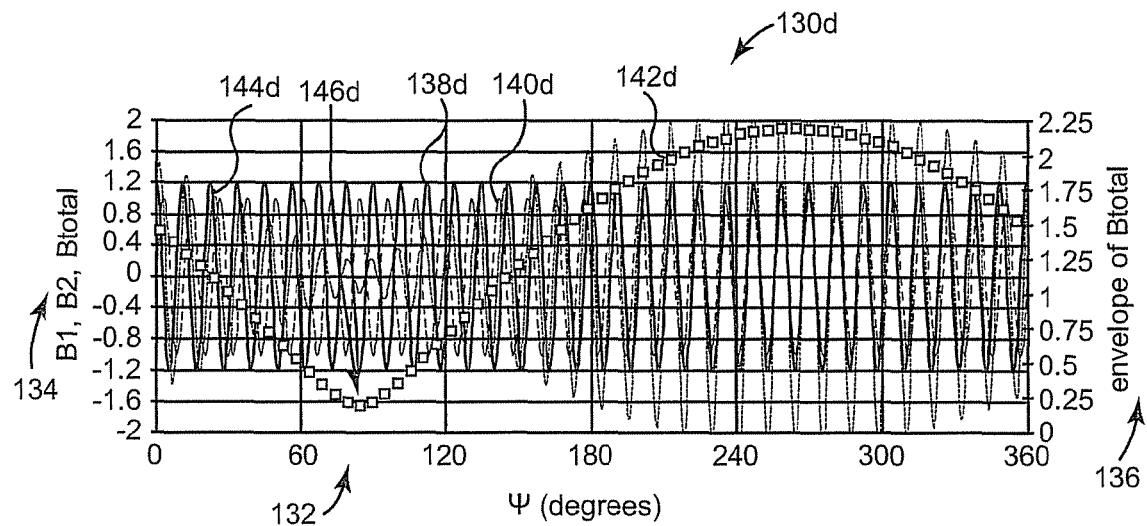
FIG. 6 is a chart illustrating another embodiment of magnetic fields and an envelope of a total magnetic field detected by a position sensor.

FIG. 6 is a chart 130d illustrating another embodiment of magnetic fields and an envelope of a total magnetic field detected by a position sensor, such as position sensor 110 previously described and illustrated with reference to FIG. 2.

Chart 130*d* indicates ψ in degrees on x-axis 132. Chart 130*d* indicates the amplitude of the magnetic field ($B_1$) from the first code wheel, the amplitude of the magnetic field ($B_2$) from the second code wheel, and the amplitude of the total magnetic field ($B_{total}$) on y-axis 134. Chart 130*d* indicates the amplitude of the envelope of the total magnetic field on y-axis 136.

The magnetic field of the first code wheel is indicated at 138*d* for a code wheel where N equals 32 pole pairs and the amplitude equals one. The magnetic field of the second code wheel is indicated at 140*d* for a code wheel where N equals 31 pole pairs and the amplitude equals 1.2. The total magnetic field detected by the magnetic field sensor positioned between the first code wheel and the second code wheel is indicated at 144*d*. The envelope of the total magnetic field is indicated at 142*d*. As indicated by chart 130*d*, even where the magnetic fields of each of the pole wheels are not equal, there is still a minimum of the envelope as indicated at 146*d*.

In one embodiment, if the torsion to be detected is small, a complete code wheel is not necessary. In this embodiment, a portion of each code wheel can be used, such as a quarter of each code wheel. If the code wheel segment is too small, however, the code wheel segment will notably affect the magnetic field pattern, which will have larger amplitudes near the ends of the code wheel segment. This may degrade the performance of the sensing system. The size of the code wheel segments can be selected based on the required accuracy for detecting the torsion angle. This could be determined in detail by numerical simulation of the particular application.

The number of poles per code wheel determines the resolution. In one embodiment, along a given distance (L) there are N poles for one code wheel and (N−1) poles for the other code wheel. Therefore, the pole sizes are L/N and L/(N−1). For a complete code wheel, L equals the perimeter of the code wheel. If one code wheel is moved by one pole period, the minimum of the interference pattern moves the distance L. Therefore, the gear ratio of the assembly is equal to the ratio of L over one pole period or L/N. In another embodiment, a permanent magnet is attached to the magnetic field sensor and each code wheel is replaced by a toothed wheel, where the size of the teeth of each wheel is slightly different. This embodiment operates similarly to the code wheel embodiment.

For simplicity of the following explanation of the signal processing involved for determining the torsion of the shaft, the magnetic flux density of both code wheels on the magnetic field sensor are assumed to be equal to 1 mT. Therefore, the field ($B_1$) of the first code wheel is given by:

$$B_1 = \sin(N(\psi + \alpha)) \quad \text{Equation III}$$

where:
ψ is the angular coordinate equal to the azimuthal angular position along the perimeter of the code wheel;
α is the twist between the first and second code wheels; and
N is the number of pole pairs of the first code wheel.

The field ($B_2$) of the second code ring, which includes N−1 pole pairs is given by:

$$B_2 = \sin((N-1)\psi) \quad \text{Equation IV}$$

The superposition of both magnetic fields ($B_{die}$) on the sensor die is given by:

$$B_{die} = \sqrt{2(1+\cos(\psi+N\alpha))}\sin((N-0.5)\psi+N\alpha) \quad \text{Equation V}$$

The envelope of the total magnetic field is the square root term of Equation V. This envelope may be determined in a variety of ways. According to the Nyquist sampling theorem, the waveform should be sampled at least at twice its carrier frequency. If ψ=2πt, where t is time, then the carrier frequency is N−0.5. Therefore, the waveform should be sampled at least 2N−1 cycles per second, which is at integer multiples of ψ=2π(2N−1). Thus, a first sensor element is placed at ψ=0 on the sensor die and a second sensor element is placed at ψ=2π(2N−1) on the sensor die. Therefore, the sensor elements are placed a distance λN/(2N−1) apart. If λ equals 5 mm and N equals 60, then the sensor elements are about 2.5 mm apart, which can be accommodated on a typical silicon die. Thus, the first sensor element detects the field ($B_{die,1}$) as follows:

$$B_{die,1} = \sqrt{2(1+\cos N\alpha)}\sin(N\alpha) \quad \text{Equation VI}$$

and the second sensor element detects the field ($B_{die,2}$) as follows:

$$B_{die,2} = \sqrt{2(1+\cos(2\pi/(2N-1)+N\alpha))}\sin(\pi+N\alpha) \approx -\sqrt{2(1+\cos N\alpha)}\sin(N\alpha) \quad \text{Equation VII}$$

where the approximation holds as long as α>>2π/[N(2N−1)] (e.g.: if N=60 then α>>0.05°). By computing the difference between both sensor elements, the twist α can be determined as illustrated in the following FIG. 7.

Figure 7:
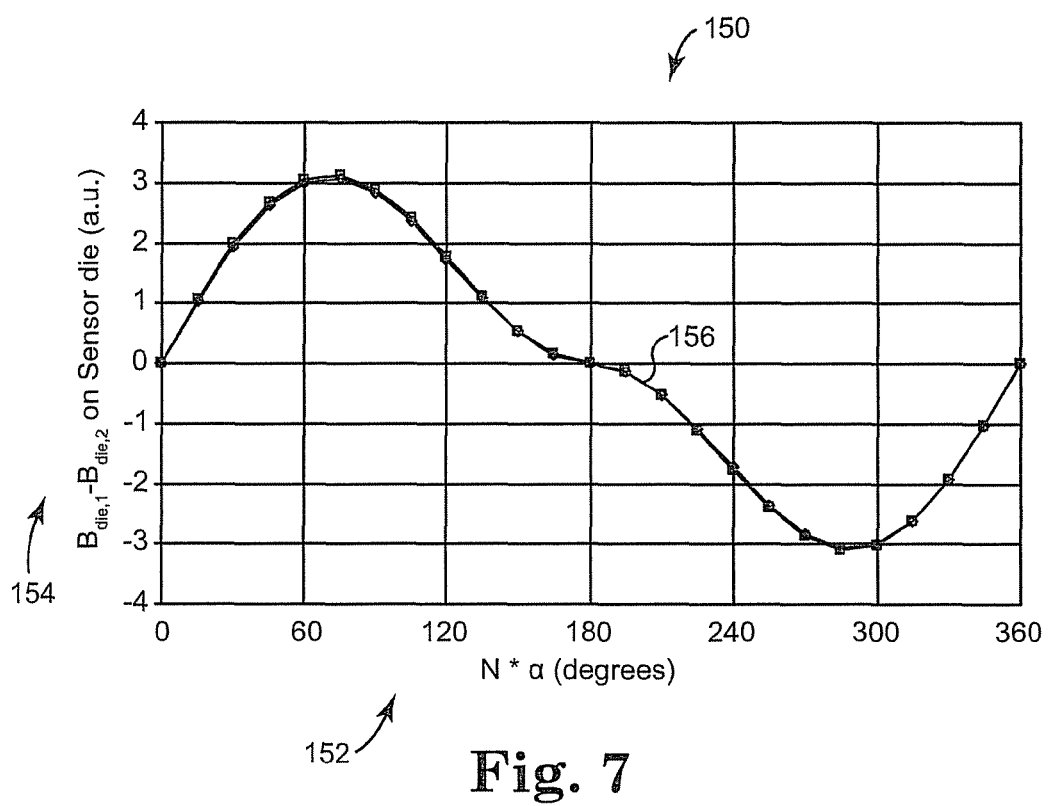
FIG. 7 is a chart illustrating one embodiment of a difference in magnetic fields of a position sensor.

FIG. 7 is a chart 150 illustrating one embodiment of a difference in magnetic fields of a position sensor, such as position sensor 110 previously described and illustrated with reference to FIG. 2. Chart 150 includes N*α in degrees on x-axis 152 and the amplitude of $B_{die,1}-B_{die,2}$ on the sensor die in arbitrary units (a.u.) on y-axis 154. The N*α for N*α>>360°/(2N−1) for N=32 is indicated at 156. As illustrated by chart 150, the function is not unique. Therefore, the sensing system may be configured to work in the range −60°<N*α<+60°, where the curve is close to linear or the sensing system may also be configured to work in the larger range 70°<N*α<+290°, where the curve is non-linear (e.g., via look-up tables).

Figure 8:
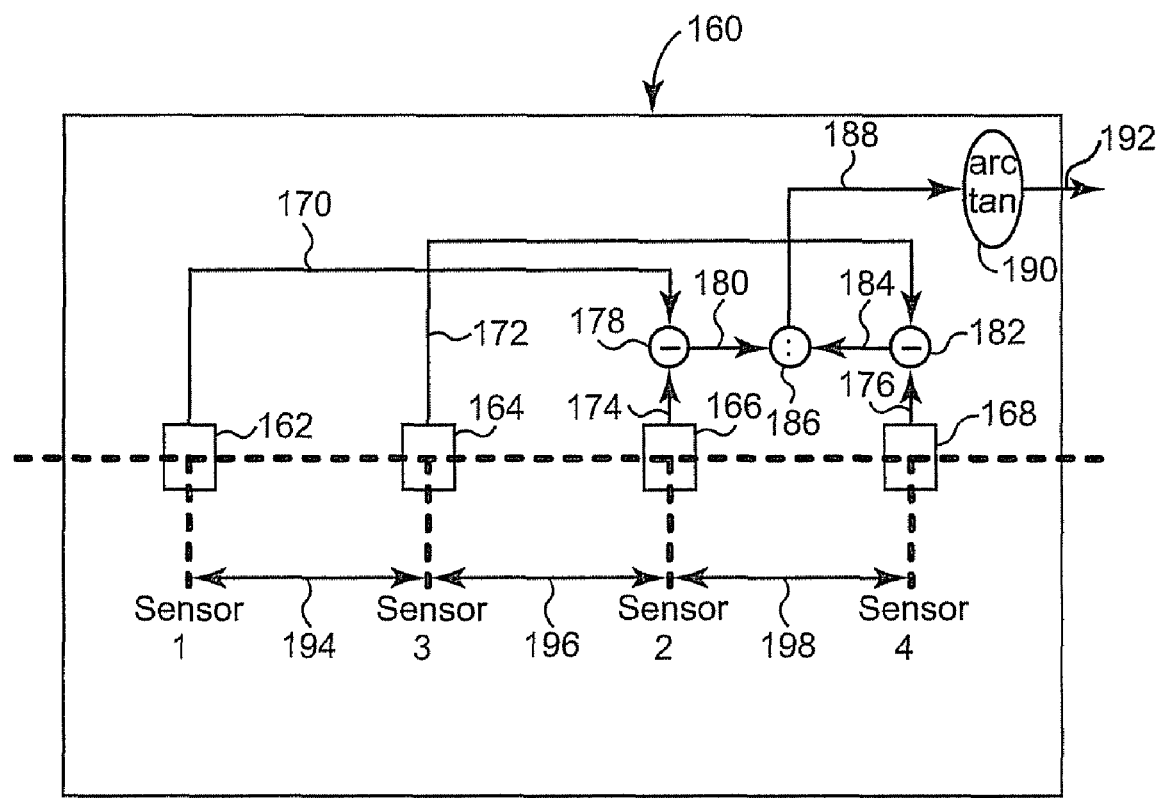
FIG. 8 is a diagram illustrating one embodiment of a sensor die.

FIG. 8 is a diagram illustrating one embodiment of a sensor die 160. In one embodiment, sensor die 160 provides magnetic field sensor 126 or a portion of magnetic field sensor 126 previously described and illustrated with reference to FIG. 2. Sensor die 160 includes a first sensor element 162, a second sensor element 166, a third sensor element 164, a fourth sensor element 168, subtraction blocks 178 and 182, a ratio block 186, and an arctangent block 190. The output of first sensor element 162 is electrically coupled to a first input of subtraction block 178 through signal path 170. The output of second sensor element 166 is electrically coupled to a second input of subtraction block 178 through signal path 174. The output of third sensor element 164 is electrically coupled to a first input of subtraction block 182 through signal path 172. The output of fourth sensor element 168 is electrically coupled to a second input of subtraction block 182 through signal path 176.

The output of subtraction block 178 is electrically coupled to a first input of ratio block 186 through signal path 180. The output of subtraction block 182 is electrically coupled to a second input of ratio block 186 through signal path 184. The output of ratio block 186 is electrically coupled to the input of arctangent block 190 through signal path 188. The output of arctangent block 190 is provided on signal path 192.

The magnetic pitch (i.e., the period of the magnetic field pattern) is indicated by λ. In one embodiment, the distance between first sensor element 162 and third sensor element 164 as indicated at 194, the distance between third sensor element 164 and second sensor element 166 as indicated at 196, and the distance between second sensor element 166 and fourth sensor element 168 as indicated at 198 equals λN/(4N−2).

In this embodiment, the magnetic field is sampled at $\psi=\pi/(2N-1)$ and $\psi=3\pi/(2N-1)$. Thus, the third sensor element detects the magnetic field ($B_{die,3}$) and the fourth sensor element detects the magnetic field ($B_{die,4}$) as follows:

$$B_{die,3}=\sqrt{2(1+\cos(\pi/(2N-1)+N\alpha))}\sin(\pi/2+N\alpha)\cong \sqrt{2(1+\cos N\alpha)}\cos(N\alpha) \qquad \text{Equation VIII}$$

$$B_{die,4}=\sqrt{2(1+\cos(3\pi/(2N-1)+N\alpha))}\sin(3\pi/2+N\alpha)\cong \sqrt{2(1+\cos N\alpha)}\cos(N\alpha) \qquad \text{Equation IX}$$

The difference ($S_{12}$) between the signals of the first and second sensor elements is determined by subtraction block 178, and the difference ($S_{34}$) between the signals of the third and fourth sensor elements is determined by subtraction block 182 as follows:

$$S_{12}=B_{die,1}-B_{die,2} \qquad \text{Equation X}$$

$$S_{34}=B_{die,3}-B_{die,4} \qquad \text{Equation XI}$$

Signals $S_{12}$ and $S_{34}$ are phase shifted by 90° since they are in-phase and quadrature components. Therefore, $N*\alpha$ is calculated by ratio block 186 and arctangent block 190 by taking the inverse tangent of the ratio of both signals $S_{12}$ and $S_{34}$ as follows:

$$\alpha=\arctan(S_{12}/S_{34}) \qquad \text{Equation XII}$$

This calculation may be performed by the coordinate rotation digital computer (CORDIC) algorithm or other suitable method.

One advantage of this sensing system is that the sensing system is differential since the sensing system uses differences of magnetic fields to derive the result. Therefore, the sensing system is not affected by homogeneous background fields (e.g., magnetic disturbances). Any background noise affects the signals of both sensor elements and therefore the background noise is canceled due to the subtraction of $S_{12}=B_{die,1}-B_{die,2}$ and $S_{34}=B_{die,3}-B_{die,4}$. Another advantage of this sensing system is that the sensing system works for $N*\alpha$ in the range of 0° to 360°.

In other embodiments, other methods of signal processing are used. For example in one embodiment, the ratio of the output signals from the first sensor element 162 and the third sensor element 164 can be used by themselves to compute the arctangent of $N*\alpha$. In another embodiment, the first sensor element 162 and the third sensor element 164 can be used by themselves to take the square of each signal and add them to obtain $2(1+\cos N\alpha)$, which can be solved via look-up tables to determine $N*\alpha$.

In another embodiment, a longer sensor die is used with more sensor elements with the spacing of $\lambda N/(4N-2)$ between two neighbors along the die. For example, four sensor elements as illustrated in FIG. 8 are used to derive the value of the envelope at their center and the procedure is repeated with an additional four sensor elements shifted to the right or left to obtain more information regarding the envelope versus the space coordinate.

Any suitable component of the magnetic field may be used. Therefore, the sensor elements that may be used include Hall sensor elements or magneto-resistive sensor elements, such as anisotropic magneto-resistive (AMR) sensor elements, giant magneto-resistive (GMR) sensor elements, or tunnel magneto-resistive (TMR) sensor elements. In addition, the code wheels may be displaced in the axial direction or the radial direction. The code wheels may also be located in the same plane with different diameters.

Figure 9:
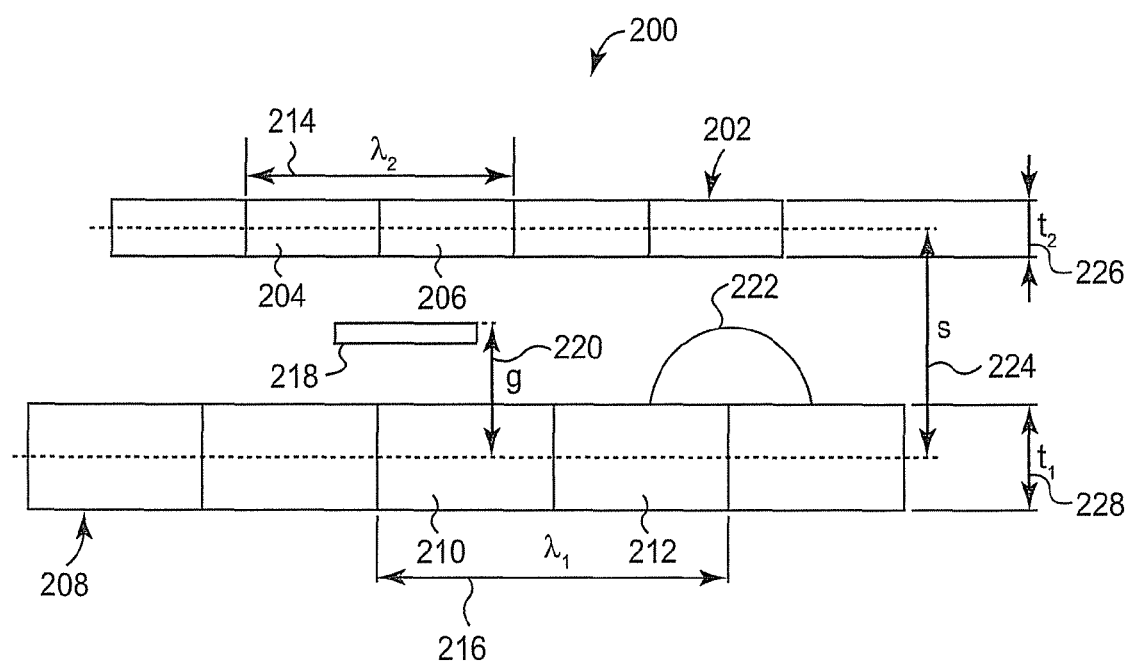
FIG. 9 is a diagram illustrating one embodiment of a linear position sensor.

FIG. 9 is a diagram illustrating one embodiment of a linear position sensor 200. Linear position sensor 200 includes a first linear code strip 208, a second linear code strip 202, and a magnetic field sensor 218. First linear code strip 208 includes a plurality of permanent magnets arranged in a chain-like manner, each magnet including a north pole 210 and a south pole 212. Second linear code strip 202 includes a plurality of permanent magnets arranged in a chain-like manner, each magnet including a north pole 206 and a south pole 204. One of first code strip 208 and second code strip 202 is fixed to a reference system and the other one of the first code strip 208 and the second code strip 202 is attached to a member that moves under the action of deformation, which is to be measured.

First code strip 208 includes a first pole period $\lambda_1$ as indicated at 216. Second code strip 202 includes a second pole period $\lambda_2$ as indicated at 214. The second pole period $\lambda_2$ is less than the first pole period $\lambda_1$. First code strip 208 is spaced apart from second code strip 202 by a distance (s) as indicated at 224. First code strip 208 has a thickness ($t_1$) as indicated at 228, and second code strip 202 has a thickness ($t_2$) as indicated at 228. A flux line of first code strip 208 is indicated at 222. Magnetic field sensor 218 is placed between first code strip 208 and second code strip 202 at a distance (g) as indicated at 220 from first code strip 208. Linear position sensor 200 operates similarly to position sensor 110 previously described and illustrated with reference to FIG. 2, except that position sensor 200 measures linear movement instead of rotational movement. The signal processing for linear position sensor 200 is similar to the signal processing for position sensor 110.

Figure 10:
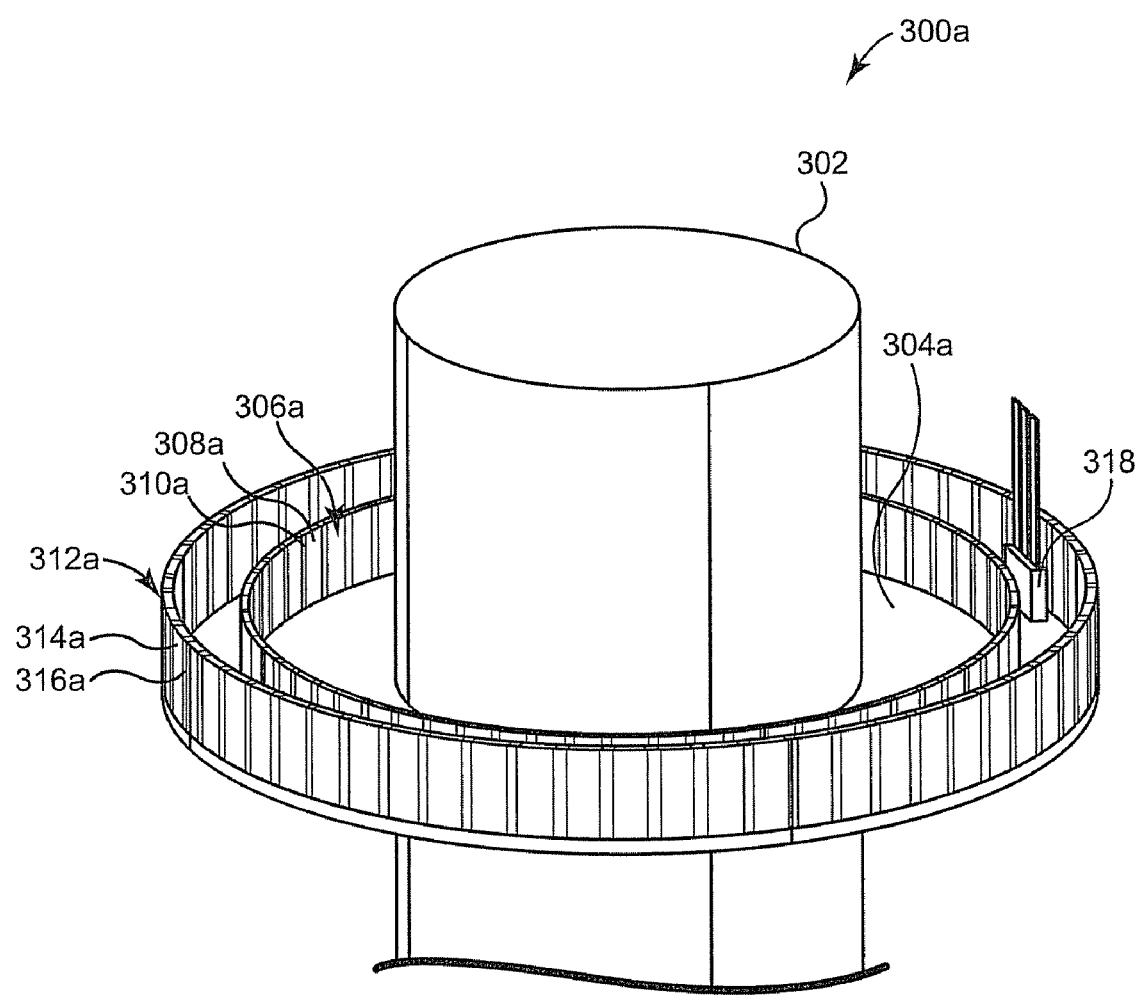
FIG. 10 is a diagram illustrating one embodiment of an angle sensor.

FIG. 10 is a diagram illustrating one embodiment of an angle sensor 300a. In one embodiment, angle sensor 300a provides sensor 106 previously described and illustrated with reference to FIG. 1. Angle sensor 300a includes a shaft 302, a wheel 304a, a first magnetic code ring 306a, a second magnetic code ring 312a, and a magnetic field sensor 318. In this embodiment, first magnetic code ring 306a and second magnetic code ring 312a are arranged radially and each code ring has a different diameter.

First code ring 306a includes a plurality of north poles 308a and south poles 310a to provide a first plurality ($N_1$) of pole pairs. Second code ring 312a includes a plurality of north poles 314a and south poles 316a to provide a second plurality ($N_2$) of pole pairs. Second code ring 312a includes a different number of pole pairs than first code ring 306a. In one embodiment, first code ring 306a includes 30 pole pairs and second code ring 312a includes 31 pole pairs. In other embodiments, each of first code ring 306a and second code ring 312a include other suitable numbers of pole pairs.

Both of code rings 306a and 312a are attached to wheel 304a, which is attached to shaft 302. In one embodiment, first code ring 306a is spaced apart from second code ring 312a by a few millimeters. Magnetic field sensor 318 is placed in between first code ring 306a and second code ring 312a. In one embodiment, magnetic field sensor 318 is attached to a fixed reference frame. Magnetic field sensor 318 detects the angular position of shaft 302 based on the combined magnetic field from first code ring 306a and second code ring 312a.

Figure 11:
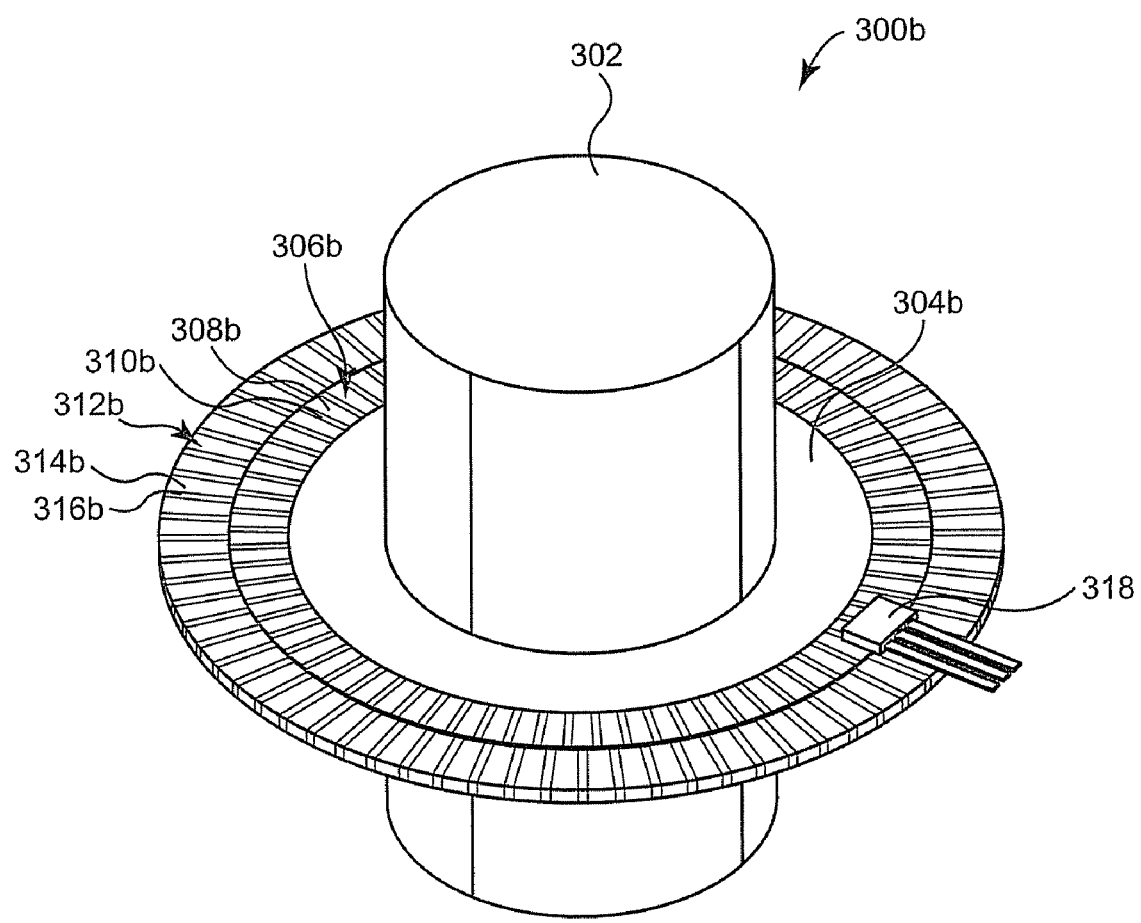
FIG. 11 is a diagram illustrating another embodiment of an angle sensor.

FIG. 11 is a diagram illustrating another embodiment of an angle sensor 300b. In one embodiment, angle sensor 300b provides sensor 106 previously described and illustrated with reference to FIG. 1. Angle sensor 300b includes a shaft 302, a wheel 304b, a first magnetic code ring 306b, a second magnetic code ring 312b, and a magnetic field sensor 318. In this embodiment, first magnetic code ring 306b and second magnetic code ring 312b are arranged radially and each code ring has a different diameter. In this embodiment, first code ring 306b and second code ring 312b are coplanar.

First code ring 306b includes a plurality of north poles 308b and south poles 310b to provide a first plurality ($N_1$) of pole pairs. Second code ring 312b includes a plurality of north poles 314b and south poles 316b to provide a second plurality ($N_2$) of pole pairs. First code ring 306b includes a different number of pole pairs than second code ring 312b. In one embodiment, first code ring 306b includes 30 pole pairs and second code ring 312b includes 31 pole pairs. In other embodiments, each of first code ring 306b and second code ring 312b include other suitable numbers of pole pairs.

Both of code rings 306b and 312b are attached to wheel 304b, which is attached to shaft 302. Magnetic field sensor 318 is placed over and between first code ring 306b and second code ring 312b. In one embodiment, magnetic field sensor 318 is attached to a fixed reference frame. Magnetic field sensor 318 detects the angular position of shaft 302 based on the combined magnetic field from first code ring 306b and second code ring 312b.

Figure 12:
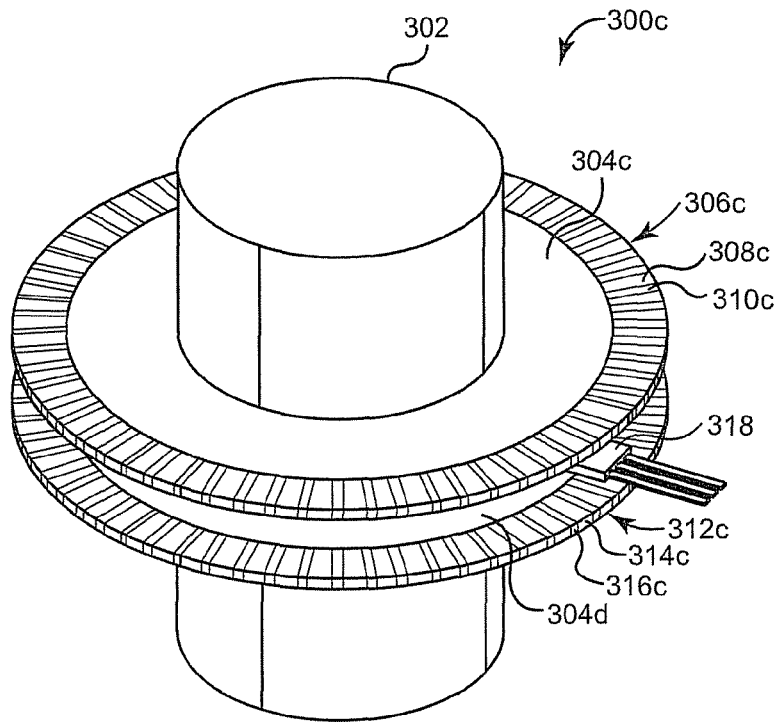
FIG. 12 is a diagram illustrating another embodiment of an angle sensor.

FIG. 12 is a diagram illustrating another embodiment of an angle sensor 300c. In one embodiment, angle sensor 300c provides sensor 106 previously described and illustrated with reference to FIG. 1. Angle sensor 300c includes a shaft 302, a first wheel 304c, a second wheel 304d, a first magnetic code ring 306c, a second magnetic code ring 312c, and a magnetic field sensor 318. In this embodiment, first code ring 306c and second code ring 312c are arranged axially and each code ring has the same diameter.

First code ring 306c includes a plurality of north poles 308c and south poles 310c to provide a first plurality ($N_1$) of pole pairs. Second code ring 312c includes a plurality of north poles 314c and south poles 316c to provide a second plurality ($N_2$) of pole pairs. First code ring 306c includes a different number of pole pairs than second code ring 312c. In one embodiment, first code ring 306c includes 30 pole pairs and second code ring 312c includes 31 pole pairs. In other embodiments, each of first code ring 306c and second code ring 312c include other suitable numbers of pole pairs.

First code ring 306c is attached to first wheel 304c, which is attached to shaft 302. Second code ring 312c is attached to second wheel 304d, which is also attached to shaft 302. In one embodiment, first code ring 306c is spaced apart from second code ring 312c by a few millimeters. Magnetic field sensor 318 is placed in between first code ring 306c and second code ring 312c. In one embodiment, magnetic field sensor 318 is attached to a fixed reference frame. Magnetic field sensor 318 detects the angular position of shaft 302 based on the combined magnetic field from first code ring 306c and second code ring 312c.

In each embodiment previously described and illustrated with reference to FIGS. 10-12, magnetic field sensor 318 senses the superposition of the magnetic fields of the first and second code rings. For the axial configuration illustrated in FIG. 12, the magnetic field ($B_1$) of the first code ring and the magnetic field ($B_2$) of the second code ring are as follows:

$$B_1 = b(r,z)\sin(N_1\psi + \psi_{10}) \quad \text{Equation XIII}$$

$$B_2 = (1+\epsilon(\psi))b(r,z-s)\sin(N_2\psi + \psi_{20}) \quad \text{Equation XIV}$$

where:
s is the axial spacing of both the first and second code rings;
b(r,z) and b(r,z-s) are functions describing the attenuation of the magnetic fields versus distance of each pole wheel; and
(1+$\epsilon$) describes a stronger field amplitude of the second pole ring (if $\epsilon$ is positive).

A positive $\epsilon$ may be achieved by certain space variations of the magnetization or thickness modulation of the code ring along its circumference. The terms $\psi_{10}$ and $\psi_{20}$ account for the angular position of each code ring on the wheel (e.g., assembly tolerance). The sum of the magnetic fields for a small $\epsilon(\psi)$ is as follows:

$$B_1 + B_2 \cong \sqrt{[b(r,z) - (1+\epsilon(\psi))b(r,z-s)]^2 + (1+\epsilon(\psi))b(r,z)b(r,z-s)\cos^2\left(\frac{N_2-N_1}{2}\psi\right)} \times \sin\left(\frac{N_2+N_1}{2}\psi - \frac{N_2-N_1}{2}\psi\frac{b(r,z)-(1+\epsilon(\psi))b(r,z-s)}{b(r,z)+(1+\epsilon(\psi))b(r,z-s)}\right) \quad \text{Equation XV}$$

The square root term of the above equation is the envelope of the magnetic field pattern, which is modulated with a low frequency as follows:

$$\cos^2\left(\frac{N_2-N_1}{2}\psi\right) \quad \text{Equation XVI}$$

The carrier frequency of the magnetic field pattern is given by the sine term in the above equation. The sine term is the high frequency portion as follows:

$$\sin\left(\frac{N_2+N_1}{2}\psi\right) \quad \text{Equation XVII}$$

The waveform is amplitude modulated with the low frequency sine wave modulated onto a high frequency sine wave. The envelope vanishes or goes to zero at odd multiples of $\psi = \pi(N_2 - N_1)$ if $b(r,z) = (1+\epsilon(\psi))b(r,z-s)$. If a single sensor element is used and if the amplitude vanishes, the sensing system also looses its zero crossings. To prevent this, $\epsilon$ can be purposely set to 10% to 30% (while the sensor is placed roughly in the center between the first and second code rings so that $b(r,z) = b(r,z-s)$). Then the envelope of $B_1 + B_2$ never vanishes as illustrated in the following FIG. 13.

Figure 13:
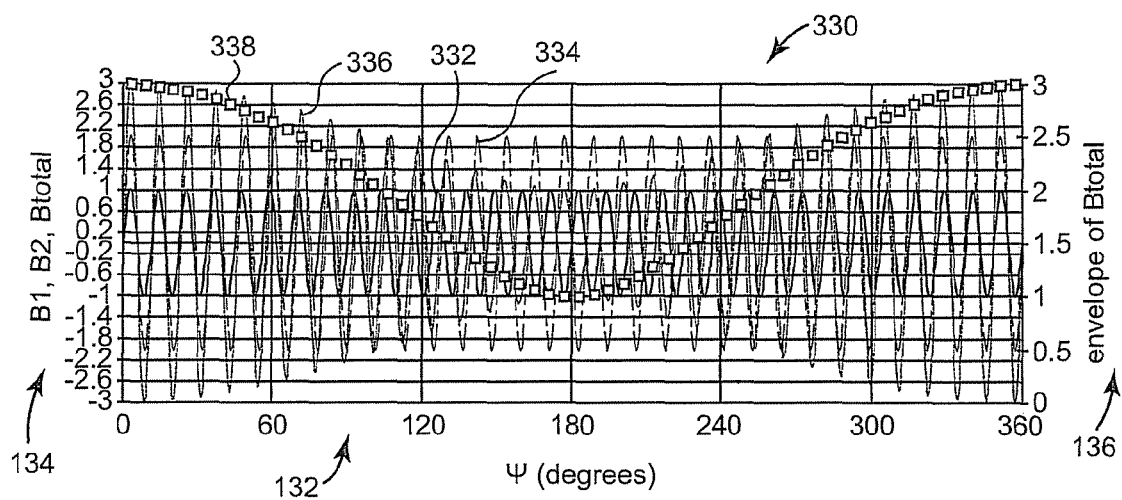
FIG. 13 is a chart illustrating one embodiment of magnetic fields and an envelope of a total magnetic field detected by an angle sensor.

FIG. 13 is a chart 330 illustrating one embodiment of magnetic fields and an envelope of a total magnetic field detected by an angle sensor, such as angle sensor 300c previously described and illustrated with reference to FIG. 12. Chart 330 indicates $\psi$ in degrees on x-axis 132. Chart 330 indicates the amplitude of the magnetic field ($B_1$) from a first code ring, the amplitude of the magnetic field ($B_2$) from a second code ring, and the amplitude of the total magnetic field ($B_{total}$) on y-axis 134. Chart 330 indicates the amplitude of the envelope of the total magnetic field on y-axis 136.

The magnetic field of the first code ring is indicated at 332 for a code ring where N equals 32 pole pairs and the amplitude equals one. The magnetic field of the second code ring is indicated at 334 for a code ring where N equals 31 pole pairs and the amplitude equals two. The total magnetic field detected by the magnetic field sensor positioned between the first code ring and the second code ring is indicated at 336. The envelope of the total magnetic field is indicated at 338.

In this embodiment, the magnetic field sensor is closer to the code ring with N=31 pole pairs or the magnetization and thickness of this code ring is stronger such that the amplitude of its magnetic field is larger than the magnetic field of the other code ring. Therefore, the envelope of the total magnetic field changes from 0.5 to 1.5 and does not vanish for any angle ψ from 0° to 360°. The envelope is substantially identical for axial and azimuthal magnetic field components ($B_z$, $B_\psi$). In this embodiment, the total magnetic field has 32 periods in one revolution. In this case, λ=perimeter/max($N_1$,$N_2$), where max($N_1$,$N_2$) denotes the larger of both numbers.

The high frequency portion allows measurement of the magnetic field at two locations on the sensor die that are spaced λ/4 apart in the direction of the circumference of the code rings. The spacing of the λ/4 on the sensor die is equivalent to a phase shift of λ/4/max($N_1$,$N_2$)=90°/max($N_1$,$N_2$) in terms of rotation angle. The square root of the sum of the squares of both magnetic fields provides a good measure for the envelope. Therefore, a first sensor element provides a first sensor element signal ($s_1$) as follows:

$$s_1 = A(\psi)\sin\frac{N_2+N_1}{2}\psi \qquad \text{Equation XVIII}$$

and a second sensor element provides a second sensor element signal ($s_2$) as follows:

$$s_2 = A(\psi)\sin\left(\frac{N_2+N_1}{2}\psi + \pi/2\right) \qquad \text{Equation XIX}$$
$$= A(\psi)\cos\frac{N_2+N_1}{2}\psi$$

Therefore:

$$|A(\psi)| = \sqrt{s_1^2 + s_2^2} \qquad \text{Equation XX}$$

Thus, a sensor die can measure the envelope while the wheel is still at rest. There is no need to wait until the wheel has turned by λ. In general, if the first sensor element detects the signal:

$$s_1(\psi)=A\sin(N(\psi-\psi_1)) \qquad \text{Equation XXI}$$

and the second sensor element detects the signal:

$$s_2(\psi)=A\sin(N(\psi-\psi_2)) \qquad \text{Equation XXII}$$

and if both sensor elements are separated by an arbitrary distance (Δ):

$$\Delta=N\lambda(\psi_2-\psi_1)/(2\pi) \qquad \text{Equation XXIII}$$

then the amplitude can be provided by:

$$|A|=\sqrt{(s_2(\psi)-s_1(\psi)\cos(2\pi\Delta/\lambda))^2+s_1^2(\psi)} \qquad \text{Equation XXIV}$$

In this way, with two sensor elements spaced apart a well defined distance on a sensor die, the envelope can be derived using the above equation.

Figure 14:
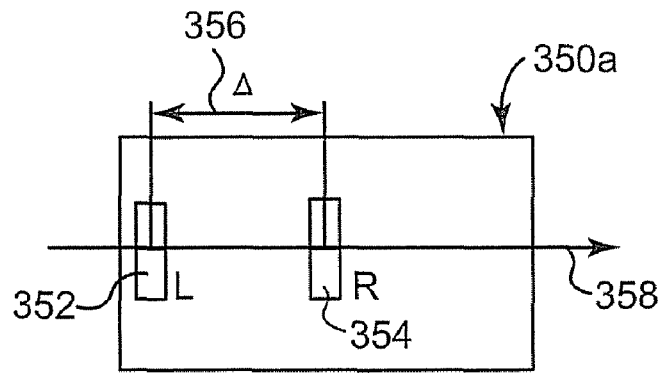
FIG. 14 is a diagram illustrating another embodiment of a sensor die.

FIG. 14 is a diagram illustrating one embodiment of a sensor die 350a. In one embodiment, sensor die 350a is used to derive the envelope using the above equation. Sensor die 350a includes a first or left sensor element 352 and a second or right sensor element 354. First sensor element 352 is spaced apart from second sensor element 354 by a distance Δ as indicated at 356. The direction of movement of the magnetic field pattern is indicated at 358.

Figure 15:
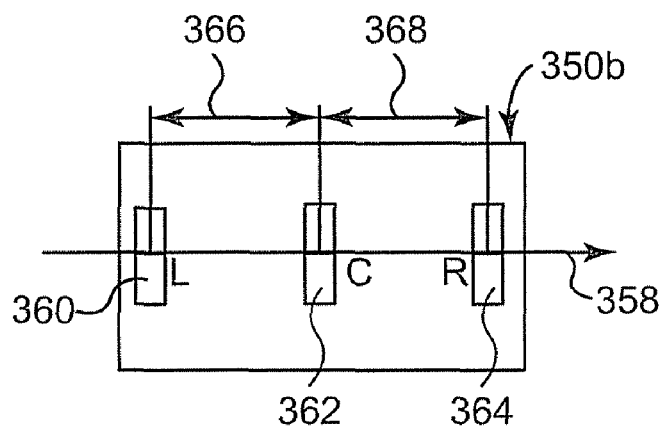
FIG. 15 is a diagram illustrating another embodiment of a sensor die.

FIG. 15 is a diagram illustrating another embodiment of a sensor die 350b. In this embodiment, the sensing system is robust against background magnetic fields by measuring the magnetic fields differentially. Sensor die 350b includes a first or left sensor element 360, a second or center sensor element 362, and a third or right sensor element 364. In one embodiment, left sensor element 360 is spaced apart from center sensor element 362 as indicated at 366 by a distance of λ/4. Right sensor element 364 is also spaced apart from center sensor element 362 as indicated at 368 by a distance λ/4. The direction of movement of the magnetic field pattern is indicated at 358.

The difference between the signal ($s_C$) of center sensor element 362 and the signal ($s_L$) of left sensor element 360 is 90° out of phase with the difference between the signal ($s_R$) of right sensor element 364 and the signal ($s_C$) of center sensor element 362. These two difference signals are used to determine the envelope using the following:

$$|A|=\sqrt{(s_C-s_L)^2+(s_R-s_C)^2} \qquad \text{Equation XXV}$$

All three sensor elements 360, 362, and 364 detect the same component of the magnetic field (e.g., they are all Hall sensors that respond to the magnetic fields perpendicular to the die surface). Since differences of magnetic fields are processed, homogeneous background magnetic fields are cancelled out.

Figure 16:
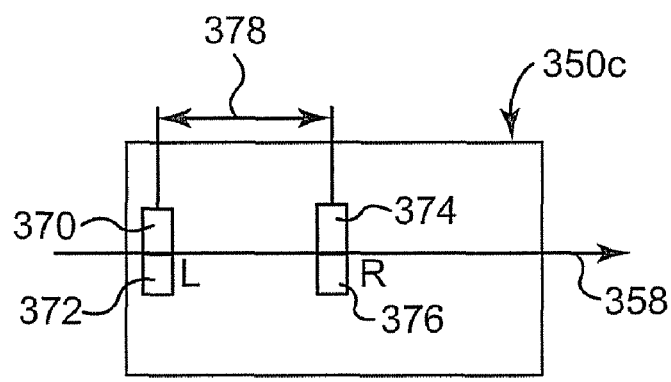
FIG. 16 is a diagram illustrating another embodiment of a sensor die.

FIG. 16 is a diagram illustrating another embodiment of a sensor die 350c. In this embodiment, two types of magnetic field sensor elements are used to detect two orthogonal components of the magnetic field. Sensor die 350c includes a first and left sensor element 370, a second and right sensor element 374, a third and left sensor element 372, and a fourth and right sensor element 376. The direction of movement of the magnetic field pattern is indicated at 358.

First sensor element 370 and third sensor element 372 are positioned at the same location along the direction of movement of the magnetic field pattern. Second sensor element 374 and fourth sensor element 376 are also positioned at the same location along the direction of movement of the magnetic field pattern. In one embodiment, first sensor element 370 and third sensor element 372 are spaced apart from second sensor element 374 and fourth sensor element 376 as indicated at 378 by a distance λ/4.

In one embodiment, first sensor element 370 and second sensor element 374 are Hall sensor elements that detect the component of the magnetic field that is perpendicular (denoted by ⊥) to the die surface. Second sensor element 372 and fourth sensor element 376 are magneto-resistive sensor elements that detect the component of the magnetic field that is parallel (denoted by ∥) to the direction of movement of the magnetic pattern. In this embodiment, the amplitude is given by:

$$|A|=\sqrt{(s_{R\perp}-s_{L\perp})^2+(s_{R\|}-s_{L\|})^2} \qquad \text{Equation XXVI}$$

where:

$s_{R\perp}-s_{L\perp}$ is the difference between the signals of first sensor element 370 and second sensor element 374; and $s_{R\|}-s_{L\|}$ is the difference between the signals of third sensor element 372 and fourth sensor element 376.

If the envelope is small, the angle is around 180° as illustrated in FIG. 13. If the envelope is large, the angle is around 0°. While the magnetic field sensor can measure the angle ψ absolutely, the value of the envelope is not unique throughout the entire range of one revolution (e.g., the envelope is identical for 90° and 270°). In addition, at 0° and 180°, the slope of the envelope versus the angle becomes small, which makes detecting the envelope at and near these angles more difficult than at other angles. Thus, the envelope can be easily detected between 60° and 160° and between 200° and 300°. To address this problem, the small sloped areas from −60° to 60° and from 160° to 200° degrees can be covered by a second magnetic field sensor, which is shifted from the first magnetic field sensor by about 90° to 120° degrees along the circumference of the code ring as illustrated in the following FIG. 17.

Figure 17:
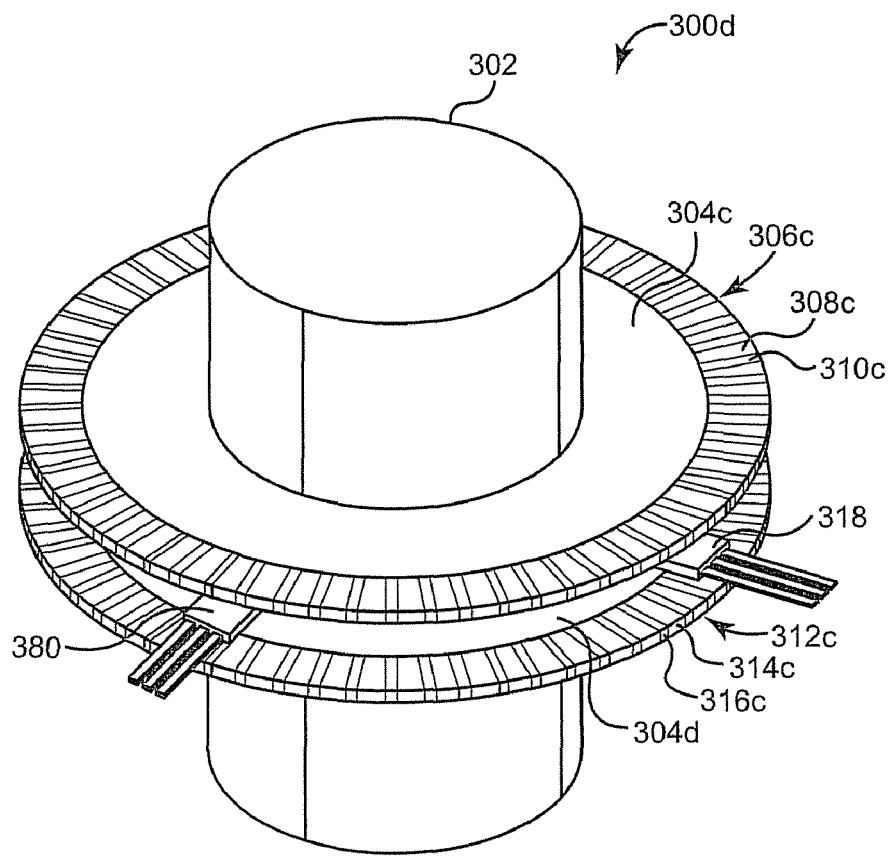
FIG. 17 is a diagram illustrating another embodiment of an angle sensor.

FIG. 17 is a diagram illustrating another embodiment of an angle sensor $300d$. In one embodiment, angle sensor $300d$ provides sensor 106 previously described and illustrated with reference to FIG. 1. Angle sensor $300d$ is similar to angle sensor $300c$ previously described and illustrated with reference to FIG. 12, except that angle sensor $300d$ includes an additional magnetic field sensor 380. Magnetic field sensor 380 is placed about 90° to 120° degrees along the circumference of code rings $306c$ and $312c$.

Figure 18:
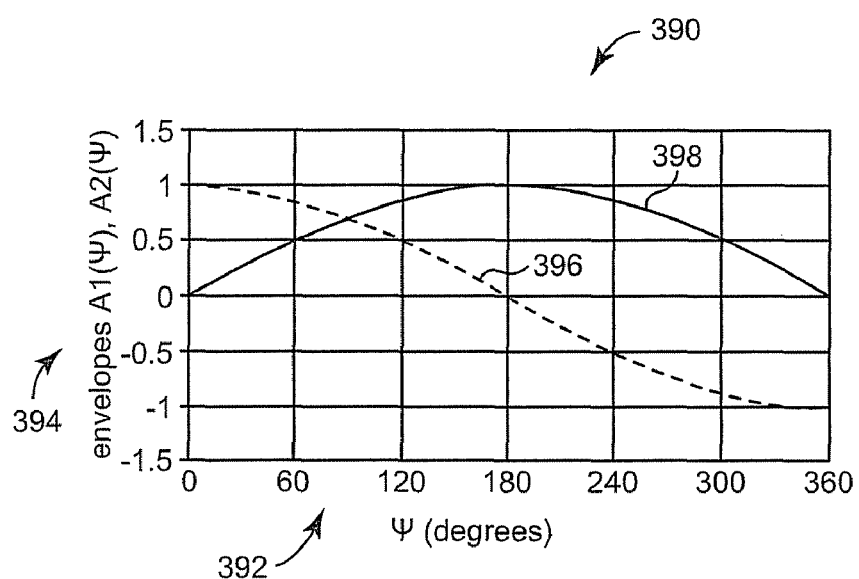
FIG. 18 is chart illustrating one embodiment of the envelope of each of two magnetic fields.

With two magnetic field sensors shifted along the circumference by an angle ($\delta$), the absolute angular position can be obtained by comparing the two envelopes as follows. The envelope ($A_1$) of the first magnetic field sensor positioned at 0° is provided by:

$$A_1(\psi) = \sqrt{[b(r,z) - (1 + \varepsilon(\psi))b(r, z-s)]^2 + 4(1 + \varepsilon(\psi))b(r,z)b(r,z-s)\cos^2\left(\frac{N_2 - N_1}{2}\psi\right)}$$ Equation XXVII The envelope ($A_2$) of the second sensor positioned at $\delta°$ is provided by:

$$A_2(\psi) = \sqrt{[b(r,z) - (1 + \varepsilon(\psi + \delta))b(r, z-s)]^2 + 4(1 + \varepsilon(\psi + \delta))b(r,z)b(r,z-s)\cos^2\left(\frac{N_2 - N_1}{2}(\psi + \delta)\right)}$$ Equation XXVIII If $\varepsilon(\psi)=0$ and $b(r,z)=b(r,z-s)$, the two envelopes are proportional to:

$$A_1(\psi) = \cos\left(\frac{N_2 - N_1}{2}\psi\right)$$ Equation XXIX $$A_2(\psi) = \cos\left(\frac{N_2 - N_1}{2}(\psi + \delta)\right)$$ Equation XXX By use of goniometric identities, from these two equations, the following is derived:

$$\sin\left(\frac{N_2 - N_1}{2}\psi\right) = \frac{\left(A_1(\psi)\cos\left(\frac{N_2 - N_1}{2}\delta\right) - A_2(\psi)\right)}{\sin\left(\frac{N_2 - N_1}{2}\delta\right)}$$ Equation XXXI So the sin e and cos ine terms are:

$$\cos\left(\frac{N_2 - N_1}{2}\psi\right) = A_1(\psi)$$ Equation XXXII $$\sin\left(\frac{N_2 - N_1}{2}\psi\right) = \frac{\left(A_1(\psi)\cos\left(\frac{N_2 - N_1}{2}\delta\right) - A_2(\psi)\right)}{\sin\left(\frac{N_2 - N_1}{2}\delta\right)}$$ Equation XXXIII From each of these equations, the argument $(N_2-N_1)/(2\psi)$ is calculated using CORDIC algorithms or another suitable method. For a particular embodiment in which $\delta=\pi/(N_2-N_1)$ the equations are simplified as follows:

$$\cos\left(\frac{N_2 - N_1}{2}\psi\right) = A_1(\psi)$$ Equation XXXIV $$\sin\left(\frac{N_2 - N_1}{2}\psi\right) = -A_2(\psi)$$ Equation XXXV If $N_2=N_1+1$, the following FIG. 18 illustrates the two curves versus the rotation angle.

FIG. 18 is chart 390 illustrating one embodiment of the envelope of each of two magnetic fields. Chart 390 includes $\psi$ in degrees on x-axis 392 and the amplitude of envelopes $A_1(\psi)$ and $A_2(\psi)$ on y-axis 394. Curve 396 illustrates the envelope for $A_1(\psi)$ and curve 398 illustrates the envelope for $A_2(\psi)$. By comparing $A_1(\psi)$ and $A_2(\psi)$, the absolute angular position is obtained.

Figure 19:
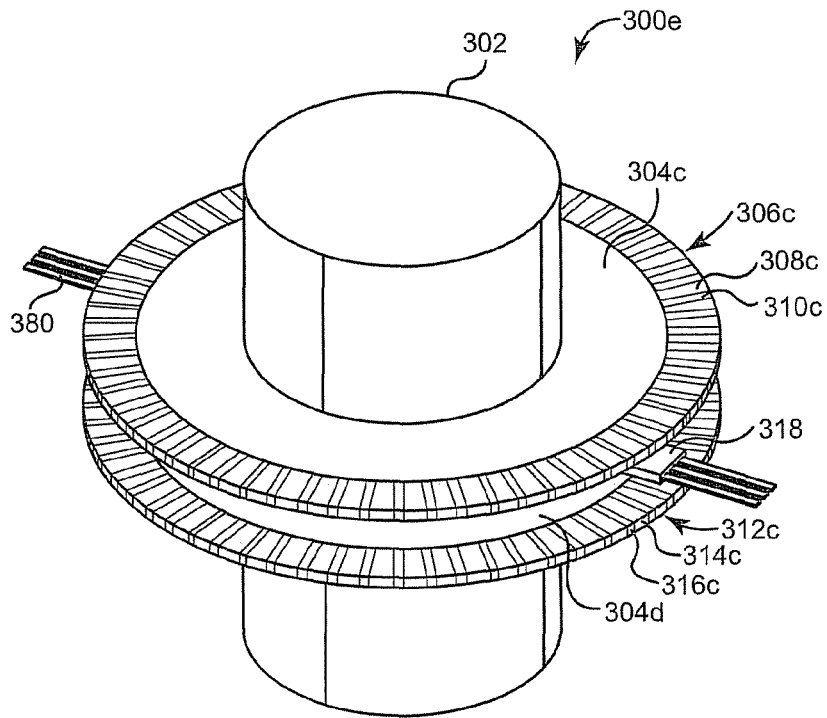
FIG. 19 is a diagram illustrating another embodiment of an angle sensor.

A shift of $\delta=\pi/(N_2-N_1)$ provides the arrangement illustrated in the following FIG. 19. FIG. 19 is a diagram illustrating another embodiment of an angle sensor $300e$. In one embodiment, angle sensor $300e$ provides sensor 106 previously described and illustrated with reference to FIG. 1. Angle sensor $300e$ is similar to angle sensor $300e$ previously described and illustrated with reference to FIG. 12, except that angle sensor $300e$ includes an additional magnetic field sensor 380. Magnetic field sensor 380 is placed about 180° degrees along the circumference of code rings $306c$ and $312c$.

When more than one magnetic field sensor is used, the magnetic field sensors are synchronized so that their outputs reflect the position of the code rings at the same time. If the position of the shaft is not well defined due to slackness of bearings or wear, a code ring arrangement with 180° symmetry can be used. The 180° symmetry can be provided by setting $N_2=N_1+2$. The magnetic field pattern in this embodiment provides a double periodicity since $N_2-N_1=2$.

Figure 20:
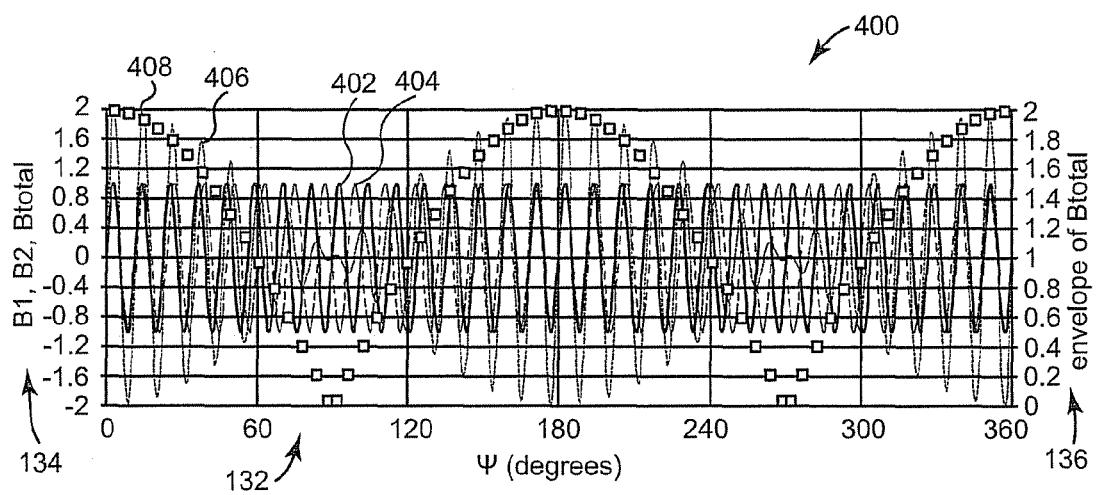
FIG. 20 is a chart illustrating another embodiment of magnetic fields and an envelope of a total magnetic field detected by an angle sensor.

FIG. 20 is a chart 400 illustrating another embodiment of magnetic fields and an envelope of a total magnetic field detected by an angle sensor, such as angle sensor $300e$ previously described and illustrated with reference to FIG. 19.

Chart 400 indicates ψ in degrees on x-axis 132. Chart 400 indicates the amplitude of the magnetic field ($B_1$) from a first code ring, the amplitude of the magnetic field ($B_2$) from a second code ring, and the amplitude of the total magnetic field ($B_{total}$) on y-axis 134. Chart 400 indicates the amplitude of the envelope of the total magnetic field on y-axis 136.

The magnetic field of the first code ring is indicated at 402 for a code ring where N equals 32 pole pairs and the amplitude equals one. The magnetic field of the second code ring is indicated at 404 for a code ring where N equals 30 pole pairs and the amplitude equals one. The total magnetic field detected by the magnetic field sensor positioned between the first code ring and the second code ring is indicated at 406. The envelope of the total magnetic field is indicated at 408.

The envelope indicated at 408 is periodical with a period of 180°. Therefore, if two magnetic field sensors are placed directly opposite each other as illustrated in FIG. 19, both sensors detect substantially the same magnetic field. If, however, the axis moves to the right, the distance to the right sensor decreases while the distance to the left sensor increases. An evaluation of the average of both sensor outputs is independent of the lateral movement of the shaft. Therefore, the sensing system is robust against slackness of bearings or wear.

Figure 21:
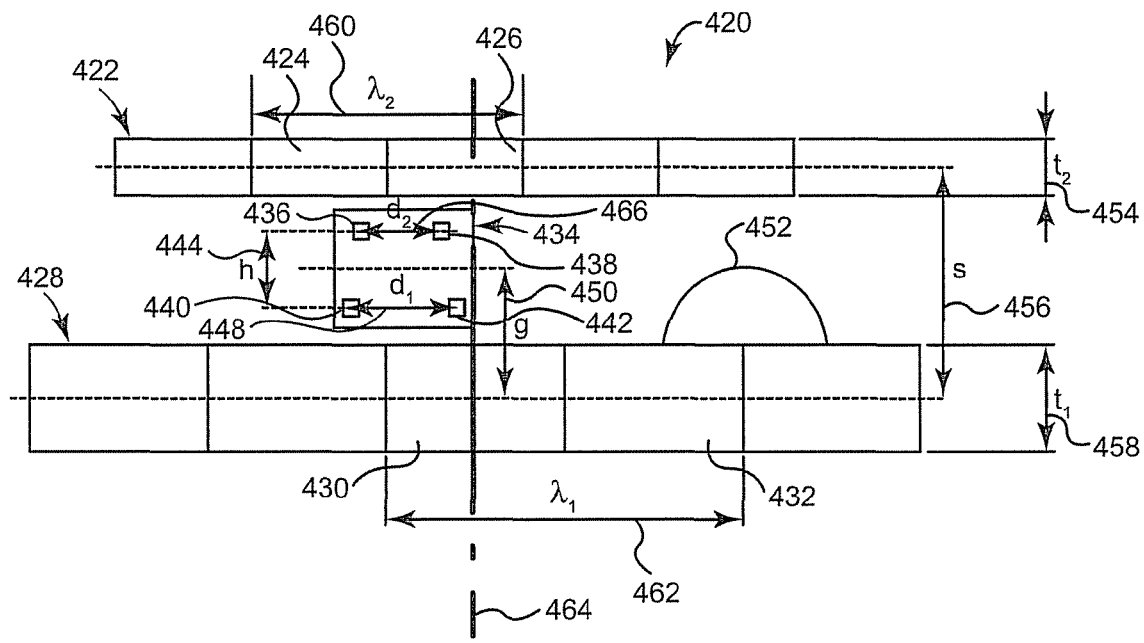
FIG. 21 is a diagram illustrating another embodiment of an angle sensor.

FIG. 21 is a diagram illustrating another embodiment of an angle sensor 420. Angle sensor 420 includes a first code ring 428, a second code ring 422, and a magnetic field sensor 434. First code ring 428 includes a plurality of north poles 430 and south poles 432 to provide a first plurality of pole pairs. Second code ring 422 includes a plurality of north poles 426 and south poles 424 to provide a second plurality of pole pairs. First code ring 428 includes a different number of pole pairs than second code ring 422.

First code ring 428 includes a first pole period $\lambda_1$ as indicated at 462 and a first thickness $t_1$ as indicated at 458. Second code ring 422 includes a second pole period $\lambda_2$ as indicated at 460 and a second thickness $t_2$ as indicated at 454. The second pole period $\lambda_2$ is less than the first pole period $\lambda_1$, and the second thickness $t_2$ is less than the first thickness $t_1$. The axial spacing (s) between first code ring 422 and second code ring 428 is indicated at 456. A flux line of first code ring 428 is indicated at 452. The axis of rotation is indicated at 464.

Magnetic field sensor 434 is a die including a first left sensor element ($s_{1L}$) 440, a first right sensor element ($s_{1R}$) 442, a second left sensor element ($s_{2L}$) 436, and a second right sensor element ($s_{2R}$) 438. The sensor elements include planar or vertical Hall sensor elements or magneto-resistive sensor elements, such as AMR, GMR, TMR, and XMR. First left sensor element 440 is separated from first right sensor element 442 by a first distance ($d_1$) as indicated at 448. Second left sensor element 436 is separated from second right sensor element 438 by a second distance ($d_2$) as indicated at 466. The normal of sensor die 434 points in the radial direction of first code ring 428 and second code ring 422. The center of sensor die 434 is separated from the center of first code ring 428 by a distance (g) as indicated at 450.

In this embodiment, since magnetic fields decay rapidly with distance, sensor elements 436 and 438 detect only magnetic fields from second code ring 422 while sensor elements 440 and 442 detect only magnetic fields from first code ring 428. Sensor elements 436 and 438 detect the angle $N_2\psi$ by one of two methods as described below.

For the first method, the same magnetic field component is measured at two points spaced apart by one quarter of the magnetic period where $d_2=\lambda_2/4$. This provides in-phase and quadrature components of the magnetic field components as follows:

$$s_{2L}=b_2(r,z)\sin(N_2\psi+\psi_{20})$$ Equation XXXVI $$s_{2R}=b_2(r,z)\sin(N_2\psi+\psi_{20}+\pi/2)=b_2(r,z)\cos(N_2\psi+\psi_{20})$$ Equation XXXVII With these two values, the argument $N_2\psi+\psi_{20}$ is computed up to an integer multiple of $2\pi$. Since this calculation only refers to the ratio of both values, the calculation is robust against lifetime drift of the magnetic moment (i.e., change in $b_2(r,z)$) since this term cancels in the calculation.

For the second method, two orthogonal field components are measured at the same point. Orthogonal field components of a code ring are always 90° phase shifted and have identical amplitude $b_2(r,z)$. The components of the magnetic field are as follows:

$$s_{2\perp}=b_2(r,z)\sin(N_2\psi+\psi_{20})$$ Equation XXXVIII $$s_{2\parallel}=b_2(r,z)\cos(N_2\psi+\psi_{20})$$ Equation XXXIX The third magnetic field component, which is much smaller than the other two, is discarded. This method uses two types of magnetic field sensors, which respond to orthogonal magnetic field components and both types of sensors are calibrated with respect to each other. The sensor system computes the arctangent of the in-phase and quadrature components to determine $N_2\psi$, which is not unique up to integer values of $2\pi$. Therefore, sensor elements 436 and 438 are used to determine the rotation angle as follows:

$$\psi=\arctan(s_{2L}/s_{2R})+2\pi k_2/N_2$$ Equation XL where:
$k_2$ is an unknown integer.
Analogously, sensor elements 440 and 442 are used to determine the rotation angle as follows:

$$\psi=\arctan(s_{1L}/s_{1R})+2\pi k_1/N_1$$ Equation XLI where:
$k_1$ is an unknown integer.
An algorithm is used to determine $k_1$ and $k_2$ and then to derive ψ. The algorithm is known in the art and therefore not part of this invention.

Figure 22:
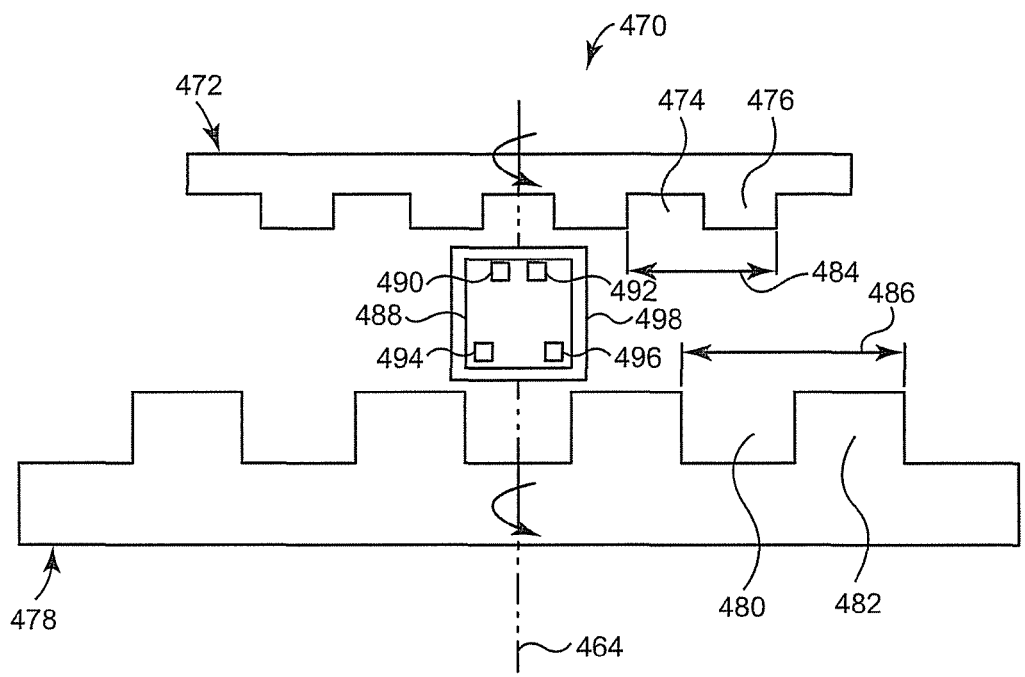
FIG. 22 is a diagram illustrating another embodiment of an angle sensor.

FIG. 22 is a diagram illustrating another embodiment of an angle sensor 470. Angle sensor 470 includes a first toothed wheel 478, a second toothed wheel 472, a magnetic field sensor 488, and a permanent magnet 498. Permanent magnet 498 is attached to the rear side of magnetic field sensor 488. Toothed wheels 478 and 472 and permanent magnet 498 are used in place of the code rings previously described.

First toothed wheel 478 includes a first plurality of teeth 482 and gaps 480 between the teeth. Second toothed wheel 472 includes a second plurality of teeth 476 and gaps 474 between the teeth. First toothed wheel 478 includes a different number of teeth than second toothed wheel 472. First toothed wheel 478 includes a first tooth period as indicated at 486. In one embodiment, the first tooth period is $\lambda_1/4$. Second toothed wheel 472 includes a second tooth period as indicated at 484. In one embodiment, the second tooth period is $\lambda_2/4$. The second tooth period is less than the first tooth period. The axis of rotation is indicated at 464. Magnetic field sensor 488 is a die including a first left sensor element ($s_{1L}$) 494, a first right sensor element ($s_{1R}$) 496, a second left sensor element ($s_{2L}$) 490, and a second right sensor element ($s_{2R}$) 492.

The shaft to which both toothed wheels 478 and 472 are fixed spins such that the teeth move at equal speed. The material of toothed wheels 478 and 472 is soft magnetic material having a high permeability greater than 100, such as 4000 for pure iron. Permanent magnet 498 is polarized in the direction of rotation axis 464 or in the direction perpendicular to the direction of rotation axis 464. The magnetic field of permanent magnet 498 is influenced by the presence of teeth.

Whenever a tooth is nearby, the magnetic field increases while the magnetic field decreases when a gap is nearby. The spacing of the teeth of second toothed wheel 472 is less than the spacing of the teeth of first toothed wheel 478 such that the magnetic pitch of the second toothed wheel 472 is less than the magnetic pitch of the first toothed wheel 478.

In one embodiment, sensor elements 490 and 492 are spaced apart a quarter of the magnetic pitch of second toothed wheel 472. In one embodiment, sensor elements 494 and 496 are spaced apart a quarter of the magnetic pitch of first toothed wheel 478. The signal processing for determining the angle ψ when using toothed wheels 478 and 472 is similar to the signal processing when using permanently magnetized code rings as previously described.

Embodiments provide sensors for detecting the position or angle of a shaft. In one embodiment, two code rings with slightly different pole sizes are positioned near each other. One of the code rings is moved with respect to the other code ring by a small displacement (e.g., deformation of a shaft). A magnetic field sensor placed between the two code rings measures the interference pattern of the magnetic fields of both code wheels and determines the deformation. In another embodiment, two target rings (either permanent magnetic pole rings or soft magnetic toothed rings) are attached to a rotor and a magnetic field sensor is positioned between the two rings and attached to a stator (or vice versa). The target rings have different numbers of poles or teeth. The magnetic field sensor detects the superposition of the magnetic fields of both rings or detects each magnetic field separately and combines them in a signal processing unit. In this way, the rotation angle within the range of 0° to 360° can be determined in real time.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An apparatus comprising:
a shaft;
a first code ring comprising a first number of pole pairs, the first code ring attached to the shaft;
a second code ring comprising a second number of pole pairs different from the first number, the second code ring attached to the shaft and spaced apart from the first code ring; and
a first magnetic field sensor between the first code ring and the second code ring for sensing a first superposition of magnetic fields provided by the first code ring and the second code ring,
wherein the first code ring and the second code ring are on a same wheel attached to the shaft.

2. The apparatus of claim 1, wherein the second number of pole pairs is one less than the first number of pole pairs.

3. The apparatus of claim 1 wherein the second code ring is radially spaced apart from the first code ring.

4. The apparatus of claim 3, wherein the first code ring and the second code ring are coplanar.

5. The apparatus of claim 1, wherein the first magnetic field sensor comprises a die comprising a first sensor element and a second sensor element spaced apart from the first sensor element.

6. The apparatus of claim 5, wherein the die comprises a third sensor element spaced apart from the second sensor element to provide a differential magnetic field sensor.

7. The apparatus of claim 5, wherein the die comprises a third sensor element spaced apart from the second sensor element and a fourth sensor element spaced apart from the third sensor element to provide a differential magnetic field sensor.

8. The apparatus of claim 5, wherein the die comprises a third sensor element positioned at the first sensor element and a fourth sensor element positioned at the second sensor element,
wherein the first sensor element and the second sensor element detect a first component of a magnetic field, and
wherein the third sensor element and the fourth sensor element detect a second component of the magnetic field orthogonal to the first component.

9. The apparatus of claim 1, wherein the first magnetic field sensor comprises at least one of a Hall sensor element and a magneto-resistive sensor element.

10. The apparatus of claim 1, further comprising:
a second magnetic field sensor between the first code ring and the second code ring for sensing a second superposition of magnetic fields provided by the first code ring and the second code ring.

11. The apparatus of claim 1, further comprising:
a permanent magnet attached to the first magnetic field sensor,
wherein the first code ring comprises a first toothed wheel; and
wherein the second code ring comprises a second toothed wheel.

12. An apparatus comprising:
a shaft;
a first code ring comprising a first number of pole pairs, the first code ring attached to the shaft;
a second code ring comprising a second number of pole pairs different from the first number, the second code ring attached to the shaft and spaced apart from the first code ring;
a first magnetic field sensor between the first code ring and the second code ring, the first magnetic field sensor comprising a first sensor element configured for sensing a first magnetic field provided by the first code ring and a second sensor element configured for sensing a second magnetic field provided by the second code ring; and
a circuit configured to determine a position of the shaft based on the sensed first magnetic field and the sensed second magnetic field.

13. The apparatus of claim 12, wherein the first code ring has a first thickness, and
wherein the second code ring has a second thickness less than the first thickness.

14. The apparatus of claim 12, wherein the first magnetic field sensor comprises a third sensor element configured for sensing the first magnetic field provided by the first code ring and a fourth sensor element configured for sensing the second magnetic field provided by the second code ring.

15. The apparatus of claim 14, wherein the first sensor element and the third sensor element are separated by a first distance and the second sensor element and the fourth sensor element are separated by a second distance, and
wherein the first distance is less than the second distance.

16. The apparatus of claim 12, further comprising:
a permanent magnet attached to the first magnetic field sensor, wherein the first code ring comprises a first toothed wheel; and wherein the second code ring comprises a second toothed wheel.

17. An apparatus comprising:
a first code strip comprising first pole pairs having a first pole period;
a second code strip comprising second pole pairs having a second pole period different from the first pole period, the second code strip spaced apart from the first code strip; and
a magnetic field sensor between the first code strip and the second code strip for sensing a superposition of magnetic fields provided by the first code strip and the second code strip,
wherein the magnetic field sensor comprises a die comprising a first sensor element and a second sensor element spaced apart from the first sensor element.

18. A method for determining position, the method comprising:
providing a first code ring comprising a first number of pole pairs, the first code ring attached to a shaft;
providing a second code ring comprising a second number of pole pairs different from the first number, the second code ring attached to the shaft and spaced apart from the first code ring;
sensing, via a first magnetic field sensor, a first magnetic field interference pattern between the first code ring and the second code ring for determining a position of the shaft; and
sensing, via a second magnetic field sensor, a second magnetic field interference pattern between the first code ring and the second code ring for determining the position of the shaft.

19. The method of claim 18, wherein providing the second code ring comprises providing a second code ring comprising a second number of pole pairs that is one less than the first number of pole pairs.

20. The method of claim 18, wherein sensing the first magnetic field interference pattern comprises sensing a first magnetic field interference pattern component parallel to the shaft.

21. The method of claim 18, wherein sensing the first magnetic field interference pattern comprises sensing a first magnetic field interference pattern component perpendicular to the shaft.

22. The method of claim 18, wherein providing the second code ring comprises providing a second code ring comprising a second number of pole pairs that is two less than the first number of pole pairs, and
wherein sensing the second magnetic field interference pattern comprises sensing the second magnetic field interference pattern between the first code ring and the second code ring at a position opposite to a position where the first magnetic field interference pattern is sensed.

23. A method for determining position, the method comprising:
providing a first code ring comprising a first number of pole pairs, the first code ring attached to a shaft;
providing a second code ring comprising a second number of pole pairs different from the first number, the second code ring attached to the shaft and spaced apart from the first code ring;
sensing, via a first sensor element, a first magnetic field provided by the first code ring;
sensing, via a second sensor element, a second magnetic field provided by the second code ring; and
determining a position of the shaft based on the sensed first magnetic field and the sensed second magnetic field.

24. The method of claim 23, wherein providing the first code ring comprises providing the first code ring having a first thickness, and
wherein providing the second code ring comprises providing the second code ring having a second thickness less than the first thickness.

25. The method of claim 23, further comprising:
providing a permanent magnet between the first code ring and the second code ring,
wherein providing the first code ring comprises providing a first toothed wheel; and
wherein providing the second code ring comprises providing a second toothed wheel.

* * * * *